(12) United States Patent
Kawaguchi et al.

(10) Patent No.: US 9,576,191 B2
(45) Date of Patent: Feb. 21, 2017

(54) POSTURE ESTIMATION DEVICE, POSTURE ESTIMATION METHOD, AND POSTURE ESTIMATION PROGRAM

(71) Applicant: Panasonic Corporation, Osaka (JP)

(72) Inventors: Kyoko Kawaguchi, Tokyo (JP); Kazuhiko Iwai, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 23 days.

(21) Appl. No.: 14/413,814

(22) PCT Filed: Jun. 4, 2013

(86) PCT No.: PCT/JP2013/003509
§ 371 (c)(1),
(2) Date: Jan. 9, 2015

(87) PCT Pub. No.: WO2014/017006
PCT Pub. Date: Jan. 30, 2014

(65) Prior Publication Data
US 2015/0169947 A1  Jun. 18, 2015

(30) Foreign Application Priority Data

Jul. 26, 2012  (JP) ................. 2012-165671

(51) Int. Cl.
*G06K 9/00*  (2006.01)
*G01S 5/16*  (2006.01)
(Continued)

(52) U.S. Cl.
CPC ........... *G06K 9/00335* (2013.01); *G01S 5/163* (2013.01); *G06K 9/00369* (2013.01);
(Continued)

(58) Field of Classification Search
USPC ................ 382/100, 103, 106–107, 117–118, 162,382/168, 173, 181, 190, 199, 203, 209, 219,382/232, 254, 274, 276, 287–296, 305, 312,382/201, 116; 345/604, 441
See application file for complete search history.

(56) References Cited

U.S. PATENT DOCUMENTS

| 8,023,726 | B2 * | 9/2011 | Sundaresan | ........ G06K 9/00342 |
| | | | | 345/604 |
| 2006/0274947 | A1 * | 12/2006 | Fujimura | ........... G06K 9/00362 |
| | | | | 382/201 |

(Continued)

FOREIGN PATENT DOCUMENTS

JP       3400961 B2     4/2003
JP    2005-339100 A    12/2005
(Continued)

OTHER PUBLICATIONS

International Search Report for Application No. PCT/JP2013/003509 dated Aug. 13, 2013.
(Continued)

*Primary Examiner* — Seyed Azarian
(74) *Attorney, Agent, or Firm* — Pearne & Gordon LLP

(57) ABSTRACT

A candidate region extraction unit (110) extracts candidate regions from an image by using a common characteristic amount. A part region extraction unit (120) separates a part region, which has a high likelihood of being a part, from a second-part candidate region other than the part region. A characteristic amount calculation unit (130) calculates the intrinsic characteristic amount of each of the part region and the second-part candidate region. A characteristic amount correction unit (140) corrects the intrinsic characteristic amount of either one of the candidate regions on the basis of the length, the width, and the angle of the other candidate
(Continued)

region. A determination unit (150) determines whether or not the part region and the second-part candidate region are parts that constitute a pair on the basis of the similarity between the corrected intrinsic characteristic amount and the intrinsic characteristic amount of the other candidate region.

11 Claims, 14 Drawing Sheets

(51) Int. Cl.
  *G06T 7/00* (2006.01)
  *G06K 9/46* (2006.01)
  *G06K 9/62* (2006.01)
  *G06T 11/20* (2006.01)

(52) U.S. Cl.
  CPC ......... *G06K 9/4604* (2013.01); *G06K 9/6202* (2013.01); *G06T 7/0046* (2013.01); *G06K 2009/6213* (2013.01); *G06T 2207/10024* (2013.01); *G06T 2207/20061* (2013.01); *G06T 2207/30196* (2013.01)

(56) References Cited

U.S. PATENT DOCUMENTS

| | | | | |
|---|---|---|---|---|
| 2009/0080711 | A1* | 3/2009 | Yokoi | G06K 9/00362 382/116 |
| 2013/0230211 | A1* | 9/2013 | Tanabiki | G06T 7/0046 382/103 |
| 2013/0243259 | A1* | 9/2013 | Kawaguchi | G06K 9/00369 382/103 |

FOREIGN PATENT DOCUMENTS

| | | |
|---|---|---|
| JP | 2007-199864 A | 8/2007 |
| JP | 2008-537815 A | 9/2008 |
| JP | 2009-075868 A | 4/2009 |
| WO | 2012/046392 A1 | 4/2012 |

OTHER PUBLICATIONS

Yusuke Takebayashi et al., "Similarity Retrieval for Motion Capture Data", The Journal of the Institute of Image Information and Television Engineers, Sep. 1, 2008 (Sep. 1, 2008), vol. 62, No. 9, pp. 1420 to 1426.

* cited by examiner

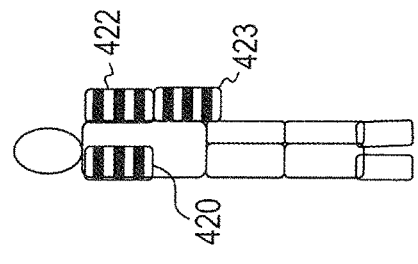
FIG. 12C
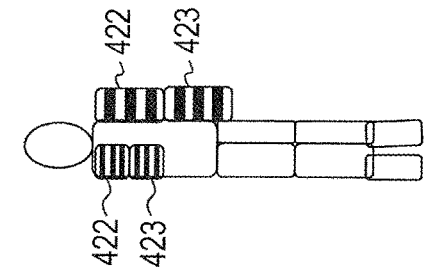
FIG. 12F
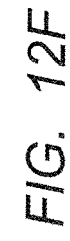
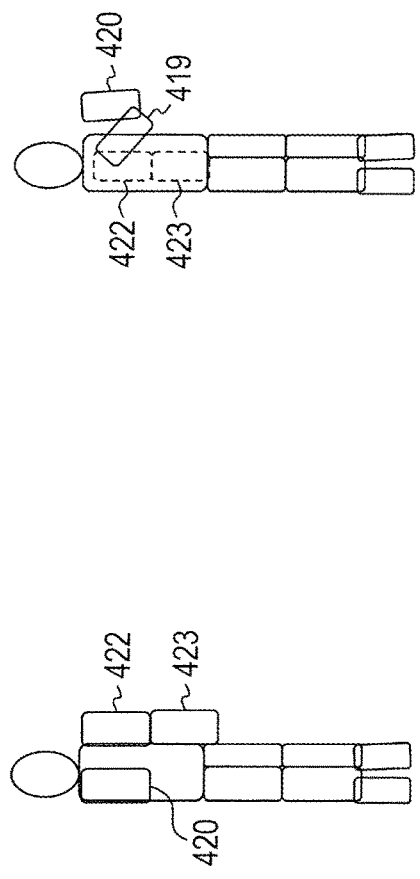
FIG. 12A
FIG. 12B
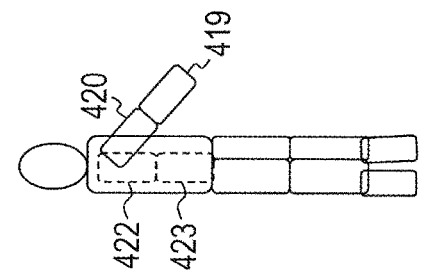
FIG. 12E
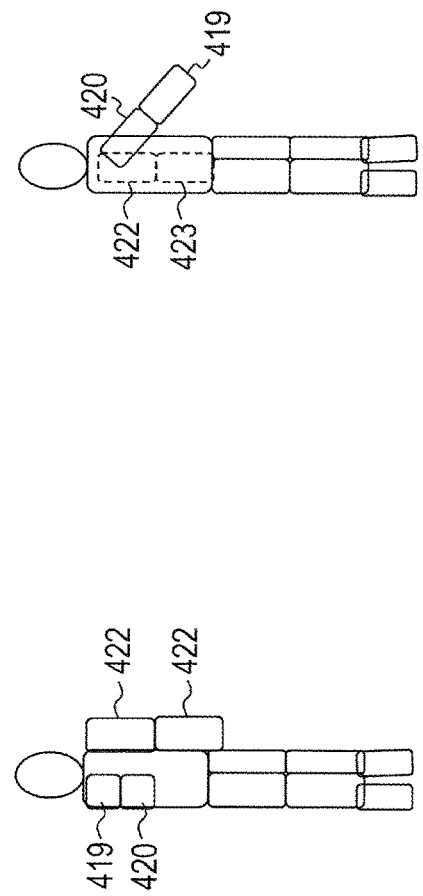
FIG. 12D

FIG. 13C

FIG. 13F
FIG. 13B
FIG. 13E
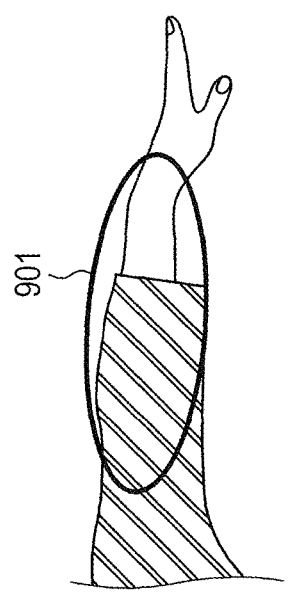
FIG. 13A
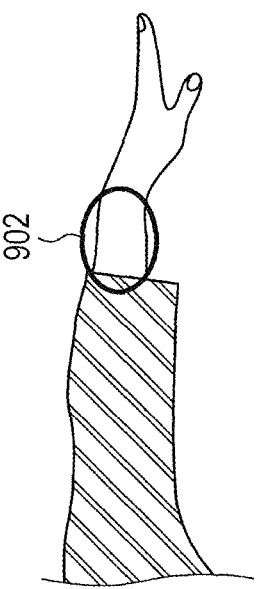
FIG. 13D

POSTURE ESTIMATION DEVICE, POSTURE ESTIMATION METHOD, AND POSTURE ESTIMATION PROGRAM

TECHNICAL FIELD

The present invention relates to a posture estimation apparatus, a posture estimation method, and a posture estimation program for estimating a posture of an articulated object having paired parts.

BACKGROUND ART

There have been active studies on estimation of human posture based on a captured moving image data. A posture estimation apparatus can determine person's motions from a moving picture through computer analysis and thus can perform behavior analysis without involving manual works. Applications of behavior analysis include detection of unexpected behaviors on the street, analysis of in-store purchase behaviors, aid in work efficiency improvement at a factory, and form coaching in sports, for instance.

When estimating a human posture, it is desirable that estimation of part posture be possible, for instance. Here, the "part" refers to a component of an articulated object (e.g., head, trunk, arm and leg). The "part posture" refers to a position or angle of the part in human posture. Since a person changes part posture by motion, if the position of the part can be estimated, it is possible to estimate motion, that is, what this person is doing or what the person is going to do from now on.

Such human posture estimation is preferably performed without attaching any apparatus such as an azimuth sensor to the person. This is because an estimation technique requiring attachment of an apparatus to a person has a difficulty in handling an unspecified person as a subject of estimation and will incur more cost when there are many subjects of estimations.

PTL 1 discloses a technique of estimating a person's posture based on an image of the person captured The technique described in PTL 1 (hereinafter referred to as "related art 1") determines a center of gravity of a person's silhouette from a captured image, calculates a distance from the center of gravity to each point on a contour of the person's silhouette, detects a vertical axis that extends upward from the center of gravity and assumes a point of intersection with the contour of the person's silhouette as a vertex of the head. Related art 1 searches for a point at which the distance calculated counterclockwise with the vertex the head as a start point becomes a maximum, determines a point at which the distance first becomes a maximum as a tip of the right hand and determines points at which the distance next becomes a maximum as tips of the right leg, left leg and left hand. According to this related art 1, it is possible to estimate a person's posture without attaching any apparatus such as an azimuth sensor to the person.

For example, PTL 2 describes a technique of estimating a person's posture based on an image of the person captured.

The technique described in PTL 2 (hereinafter referred to as "related art 2") takes pictures of a person wearing clothes in color other than blue and varying from one part to another against a blue background. Thus, related art 2 acquires the person's silhouette based on a difference in color information between the background image and the person's image and detects the person's part from color information of the clothes. Using this related art 2, it is possible to estimate a person's posture without attaching any apparatus such as a sensor to the person.

CITATION LIST

Patent Literature

PTL 1
Japanese Patent Publication No. 3400961
PTL 2
Japanese Patent Application Laid-Open No. 2005-339100

SUMMARY OF INVENTION

Technical Problem

However, related art 1 and related art 2 have a problem in that a person's posture cannot be estimated with high accuracy depending on image capturing conditions. This is because when both arms or legs are crossed or when the arm or leg overlaps with the trunk, the arm or leg overlaps in the figure silhouette, and so related art 1 cannot estimate the posture of the arm or leg. This is also because related art 2 cannot detect a person's part unless capturing an image of the person with a specific background and specific clothes.

An object of the present invention is to estimate a posture of an articulated object having paired parts with high accuracy.

Solution to Problem

A posture estimation apparatus according to an aspect of the present invention is a posture estimation apparatus that estimates a paired part based on an image including a whole or part of an articulated object having the paired part, the posture estimation apparatus including: a candidate region extraction section that extracts a plurality of candidate regions of the paired part from the image using a common feature value indicating features of a shape common to an indefinite number of articulated objects regarding the paired part; a part region extraction section that extracts a first candidate region having a maximum likelihood of being the paired part from the plurality of candidate regions and designates a region other than the first candidate region as a second candidate region; a feature value calculation section that calculates a unique feature value indicating a feature unique to the articulated object to be estimated about the paired part in each of the first candidate region and the second candidate region; a feature value correction section that corrects a unique feature value of one of the first candidate region and the second candidate region based on at least one of a length, width, and angle of the other candidate region; and a determining section that determines whether or not the first candidate region and the second candidate region are the paired parts based on similarity between the corrected unique feature value and a unique feature value of the other candidate region.

A posture estimation method according to an aspect of the present invention is a method of estimating a paired part based on an image including a whole or part of an articulated object having the paired part, the method including: extracting a plurality of candidate regions of the paired part from the image using a common feature value indicating features of a shape common to an indefinite number of articulated objects regarding the paired part; extracting a first candidate region having a maximum likelihood of being the paired part from the plurality of candidate regions and designating a region other than the first candidate region as a second candidate region; calculating a unique feature value indicating a feature unique to the articulated object to be estimated about the paired part in each of the first candidate region and the second candidate region; correcting a unique feature value of one of the first candidate region and the second candidate region based on at least one of a length, width, and angle of the other candidate region; and determining whether or not the first candidate region and the second candidate region are the paired parts based on similarity between the corrected unique feature value and a unique feature value of the other candidate region.

A posture estimation program according to an aspect of the present invention is a program that causes a computer of an apparatus that estimates a paired part based on an image including a whole or part of an articulated object having the paired part to execute processing, the program including the processing including: extracting a plurality of candidate regions of the paired part from the image using a common feature value indicating features of a shape common to an indefinite number of articulated objects regarding the paired part; extracting a first candidate region having a maximum likelihood of being the paired part from the plurality of candidate regions and designating a region other than the first candidate region as a second candidate region; calculating a unique feature value indicating a feature unique to the articulated object to be estimated about the paired part in each of the first candidate region and the second candidate region; correcting a unique feature value of one of the first candidate region and the second candidate region based on at least one of a length, width, and angle of the other candidate region; and determining whether or not the first candidate region and the second candidate region are the paired parts based on similarity between the corrected unique feature value and a unique feature value of the other candidate region.

Advantageous Effects of Invention

According to the present invention, it is possible to estimate a posture of an articulated object having paired parts with high accuracy.

BRIEF DESCRIPTION OF DRAWINGS

FIGS. 12A to 12F show an exemplary human posture in Embodiment 2 of the present invention;

FIGS. 13A to 13F show an example of an image and a histogram thereof when a unique feature value in Embodiment 2 of the present invention cannot be calculated correctly;

DESCRIPTION OF EMBODIMENTS

Embodiments of the present invention will be described in detail with reference to the accompanying drawings.

(Embodiment 1)

Embodiment 1 of the present invention represents an example of a basic aspect of the present invention.

Figure 1:
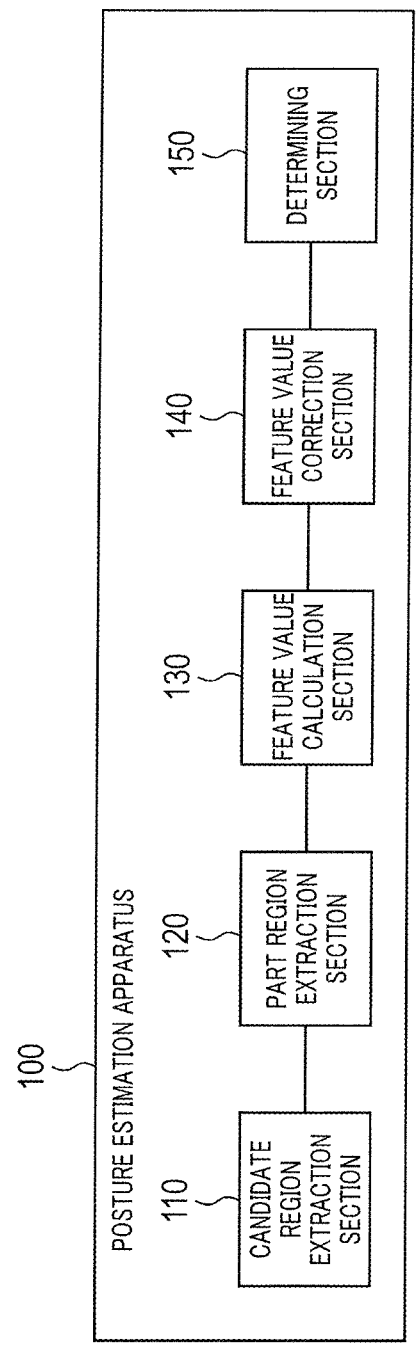
FIG. 1 is a block diagram illustrating an exemplary configuration of a posture estimation apparatus according to Embodiment 1 of the present invention.

FIG. 1 is a block diagram illustrating an exemplary configuration of a posture estimation apparatus according to the present embodiment.

In FIG. 1, posture estimation apparatus 100 includes candidate region extraction section 110, part region extraction section 120, feature value calculation section 130, feature value correction section 140, and determining section 150.

Posture estimation apparatus 100 of the present embodiment estimates a posture of "paired parts" making up an articulated object. Here, the "part" is a component of an articulated object. The "part posture" means a position or an angle of the part.

Candidate region extraction section 110 extracts a plurality of candidate regions of a part to be estimated from an image including a part or a whole of an articulated object which becomes an subject of estimation using a "common feature value." The "common feature value" represents a feature of a shape common to an indefinite number of articulated objects about paired parts (e.g., edge only or edge and silhouette). The candidate region extracted here may include a candidate region with noise. The "part to be estimated" is a paired part which is a part whose posture is to be estimated. One of the paired parts is called a "first part" and the other is called a "second part." For example, when the paired parts are forearms, the right forearm is called a first part and the left forearm is called a second part.

The above-described "shape common to an indefinite number of articulated objects of the paired parts" is determined, for example, by a possible location range of a part in an articulated object or scale, length, thickness or cross-sectional shape of the part or an angle at which an image of the articulated object is captured. The possible location range, scale, length, thickness or cross-sectional shape or an angle at which an image of the articulated object is captured about the part are predefined as restriction information of the articulated object. Candidate region extraction section 110 may also extract a candidate region based on the above-described restriction information. This allows candidate region extraction section 110 to extract a region which has a highest likelihood of being a part to be estimated as a candidate region.

Part region extraction section 120 extracts a region having a highest likelihood of being a part to be estimated among a plurality of candidate regions extracted in candidate region extraction section 110 as a first part candidate region (an example of a first candidate region). Here, the first part candidate region is called a "part region." On the other hand, a candidate region other than the part region is called a "candidate region of a second part" (an example of a second candidate region). There may be a plurality of candidate regions of the second part.

Feature value calculation section 130 calculates unique feature values of the part region and the second part candidate region respectively extracted in part region extraction section 120. The "unique feature value" calculated here represents a feature (e.g., at least one of color and texture) unique to an individual with an articulated object to be estimated about paired parts.

Feature value correction section 140 corrects (recalculates) the unique feature value of one of the part region and the second part candidate region calculated in feature value calculation section 130 based on at least one of length, width, and angle of the other candidate region. That is, feature value correction section 140 corrects the unique feature value of the part region based on at least one of the length, width, and angle of the second part candidate region. Alternatively, feature value correction section 140 corrects the unique feature value of the second part candidate region based on at least one of the length, width, and angle of the part region. The former correction method makes a correction so that the candidate region with a higher likelihood is reflected on the candidate region with a lower likelihood, and therefore improves estimation accuracy more than the latter correction method that estimates a feature value of the candidate region with a higher likelihood from the candidate region with a lower likelihood.

When there are a plurality of candidate regions of the second part, feature value correction section 140 corrects a unique feature value for each pair of the part region and the second part candidate region.

Before correcting the aforementioned unique feature value, feature value correction section 140 may perform the following process. First, feature value correction section 140 calculates similarity between the unique feature value of the part region and the unique feature value of the second part candidate region calculated in feature value calculation section 130. Next, feature value correction section 140 determines whether or not there is any second part candidate region that can be estimated to be paired with the part region based on the calculated similarity. When the determination result shows that there is no second part candidate region that can be estimated to be paired with the part region, feature value correction section 140 corrects the aforementioned unique feature value.

Determining section 150 determines whether or not the part region and the second part candidate region are paired parts based on the similarity (e.g., cosine similarity) between the unique feature value corrected in feature value correction section 140 and the unique feature value of the other candidate region.

Through this determination, a posture of the part is estimated.

Posture estimation apparatus 100 has, for example, a central processing unit (CPU), a storage medium such as a read-only memory (ROM) having a control program stored therein, and a working memory such as a random access memory (RAM). In this case, functions of the above-described sections are realized by the CPU executing the control program.

Posture estimation apparatus 100 provided with such a configuration provides the following effects.

When estimating postures of an indefinite number of articulated objects, since it is difficult to grasp in advance what clothes or color each articulated object has, it is a general practice to estimate the part using a common feature value (e.g., edge, silhouette, contour or the like). In such part estimation, if there is no other part around a certain part, only edge information of the part is extracted, and it is therefore relatively easy to estimate the part. However, during part estimation, there may be a case where there is another part around a certain part. That is, for example, when there is another part behind a certain part, not only edge information of the part but also that of the other part is acquired together, and it is therefore difficult to estimate the part. Moreover, when a certain part is hidden behind another part, the area visible from the image thereof is small and it is therefore difficult to estimate the part based on the above-described common feature value alone.

On the other hand, it is generally assumed that in articulated objects having paired parts, the paired parts often have the same clothes, color or texture. For example, in the case of a person, since the right and left legs wear single clothes, both can be assumed to have the same color or the right and left arms are also considered to have clothes of the same pattern in many cases.

Thus, posture estimation apparatus 100 first extracts a plurality of candidate regions from an image using a common feature value and divides the image into a part region and a second part candidate region. Next, posture estimation apparatus 100 calculates unique feature values for the part region and the second part candidate region respectively. Next, posture estimation apparatus 100 corrects the unique feature value of one of the part region and the second part candidate region based on at least one of the length, width, and angle of the other candidate region. Next, posture estimation apparatus 100 determines whether or not the part region and the second part candidate region are paired parts based on similarity between the corrected unique feature value and the unique feature value of the other candidate region. Even when a candidate region of the other part exists around the second part candidate region, posture estimation apparatus 100 can narrow down the second part candidate region through such an operation. Thus, even in the case where it is difficult to estimate a posture of one of the paired parts or in the case where at least one of the color and texture of the part is unknown beforehand, posture estimation apparatus 100 can estimate posture of the articulated object having paired parts with high accuracy.

(Embodiment 2)

Embodiment 2 of the present invention is an example of specific aspects of the present invention when the present invention is applied to an apparatus that receives a captured image and estimates a posture of a person included in the captured image.

First, a summary of a posture estimation system including the posture estimation apparatus according to the present embodiment will be described.

Figure 2:
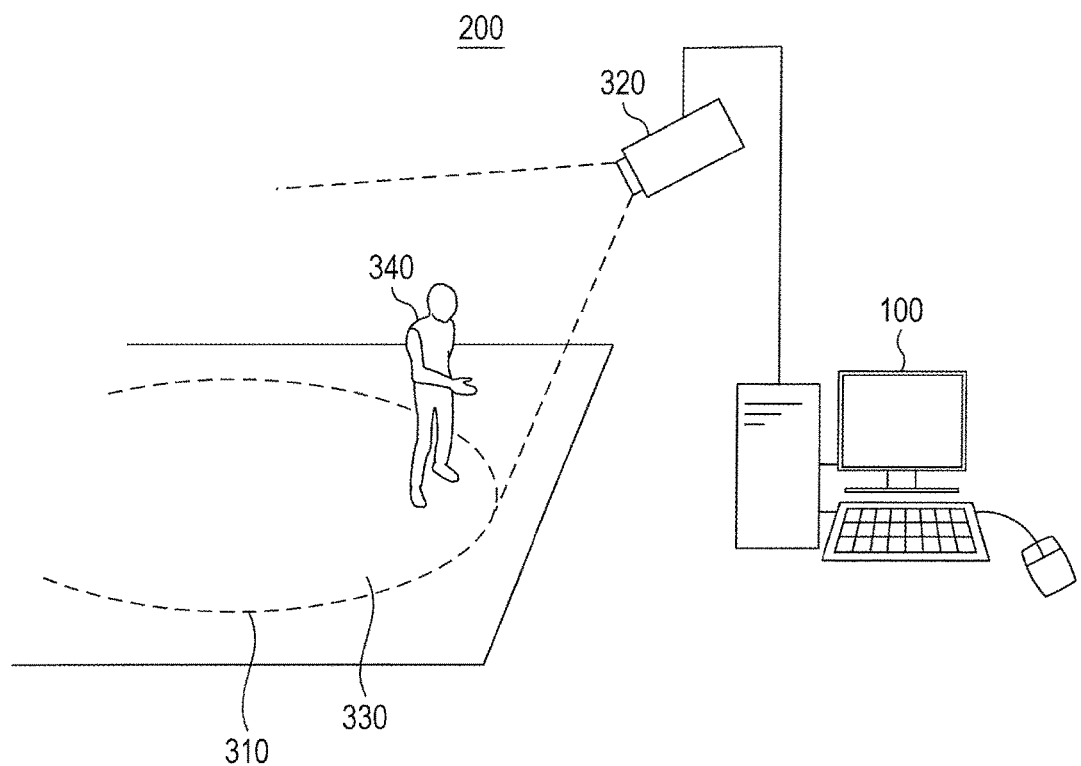
FIG. 2 is a system configuration diagram illustrating an exemplary configuration of a posture estimation system according to Embodiment 2 of the present invention.

FIG. 2 is a diagram showing an exemplary configuration of the posture estimation system in the present embodiment.

In FIG. 2, posture estimation system 200 includes camera 320 for acquiring images of image capturing area 310, and posture estimation apparatus 100 communicatively connected with camera 320. Camera 320, which may be a digital video camera for example, acquires video pictures of image capturing area 310 from above diagonally. That is, images captured by camera 320 are obtained by capturing images of a real space that includes person 340 and horizontal floor 330. Camera 320 transmits the captured image data to posture estimation apparatus 100. It is assumed here that person 340, which is the subject of part estimation, is walking on floor 330 of image capturing area 310.

Posture estimation apparatus 100, which is, for example, a personal computer, estimates a posture of person 340 based on the image data received from camera 320.

The summary of posture estimation system 200 has been described above.

Next, a posture of person 340 which is the subject of estimation in the present embodiment will be described.

Figure 3:
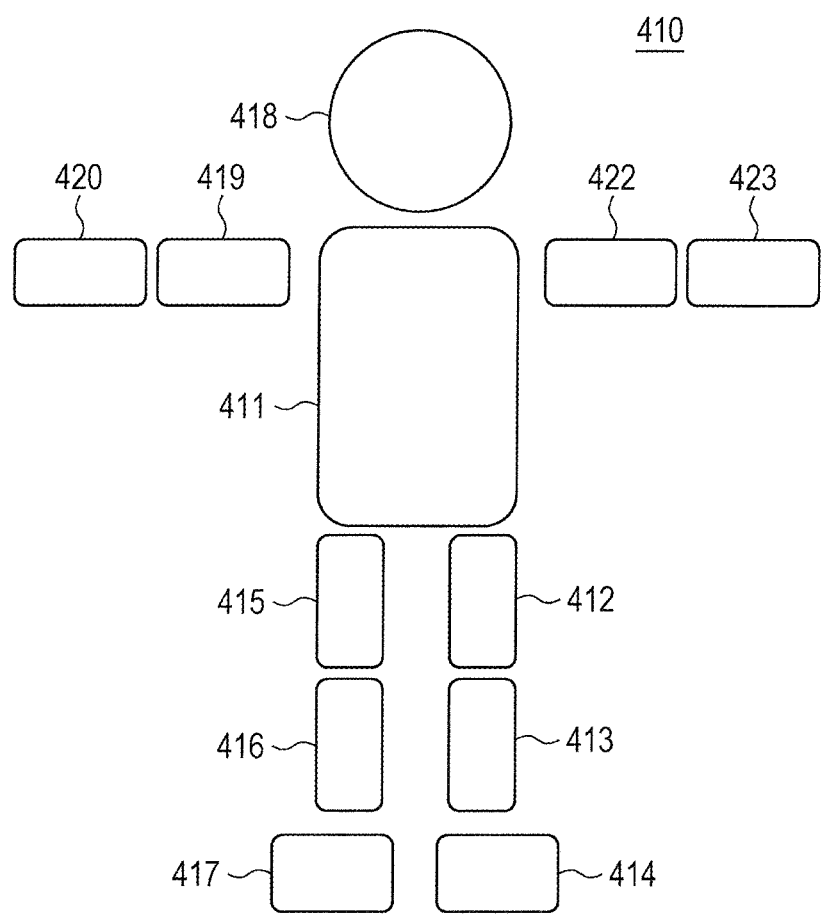
FIG. 3 shows an example of a body model in Embodiment 2 of the present invention.

FIG. 3 illustrates an example of structure model 410 for the body of person 340 (hereinafter referred to as "body model"). Body model 410 is a schematic representation of positional relationships between body parts used in posture estimation. Body model 410 includes at least trunk 411, left thigh 412, left lower leg 413, left foot 414, right thigh 415, right lower leg 416, right foot 417, head 418, right upper arm 419, right forearm 420, left upper arm 422 and left forearm 423.

These parts are connected by joints, so their ranges of motion are limited by other parts. For example, left forearm 423 can move only within a predetermined angle range centered on a point of connection with left upper arm 422. Furthermore, when a point of connection between head 418 and trunk 411 is assumed to be a reference point, a possible location region (also referred to as "possible location range") of left forearm 423 centered on the reference point is limited by the physical length and the ranges of motion of the parts of left upper arm 422 and trunk 411 which are parts as the sources of connection of left forearm 423. Information on restrictions of such a structural connection relationship of the articulated object, range of motion of the connection point, length, thickness or shape of the part is called restriction information.

In the present embodiment, posture estimation apparatus 100 extracts regions of the respective parts in body model 410 from the image information using information indicating features of parts of an individual in addition to information indicating features common to people using restriction information on the respective parts. It should be noted that the body model used by posture estimation apparatus 100 is not limited to the example illustrated in FIG. 3.

In body model 410, paired parts refer to left thigh 412 and right thigh 415, left lower leg 413 and right lower leg 416, left foot 414 and right foot 417, left upper arm 422 and right upper arm 419, and left forearm 423 and right forearm 420. Although the present embodiment will describe the paired parts as the forearms of left forearm 423 and right forearm 420 among the above-described combinations, the present embodiment is not limited to this.

The posture of person 340 which is the subject of estimation has been described above.

Next, a configuration of posture estimation apparatus 100 will be described.

FIG. 1 is a block diagram illustrating an exemplary configuration of posture estimation apparatus 100. The configuration of posture estimation apparatus 100 according to the present embodiment is the same as that of Embodiment 1. However, the present embodiment will describe person 340 as an articulated object which is the subject of estimation and the forearms (left forearm 423 and right forearm 420) as paired parts.

Candidate region extraction section 110 extracts a plurality of candidate regions estimated to be forearms from an image including a part or a whole of a person to be the subject of estimation using common feature values. The common feature values referred to here show features of a shape common to the forearms of an indefinite number of people (e.g., edge only, or edge and silhouette). The candidate regions extracted here may include candidate regions with noise, that is, candidate regions erroneously estimated as forearms from a pattern of clothes or the like.

Note that the above-described "shape common to the forearms of an indefinite number of people" is determined, for example, by the possible location range of the forearms of person 340 or the scale, length or thickness of the forearms. The possible location range, scale, length and thickness of the forearms are predefined as restriction information of a person. The possible location range of the forearms of person 340 may also be defined by a distance from a certain reference point (e.g., connection point between head 418 and trunk 411) of person 340. Candidate region extraction section 110 may be configured to extract candidate regions based on the above-described restriction information. Thus, candidate region extraction section 110 can extract a region having the highest possibility (likelihood) of being forearms as a candidate region.

Part region extraction section 120 extracts the region having the highest likelihood of being forearms among the plurality of candidate regions extracted in candidate region extraction section 110 as a candidate region of a first part of the forearms (an example of the first candidate region). Here, the candidate region of the first part is called a "part region." On the other hand, a candidate region other than the part region is called a "candidate region of a second part" (an example of the second candidate region). There may be a plurality of candidate regions of the second part.

Feature value calculation section 130 calculates unique feature values about the part region and the second part candidate region respectively extracted in part region extraction section 120. The unique feature value referred to here represents a feature unique to person 340 (e.g., at least one of color and texture) which is the subject of estimation about the forearms.

Feature value correction section 140 corrects (recalculates) the unique feature value of one of the part region and the second part candidate region calculated in feature value calculation section 130 based on at least one of the length, width, and angle of the other candidate region. That is, feature value correction section 140 corrects the unique feature value of the part region based on at least one of the length, width, and angle of the second part candidate region. Note that feature value correction section 140 may also correct the unique feature value of the second part candidate region based on at least one of the length, width, and angle of the part region. The former correction method makes a correction so that the candidate region with a higher likelihood is reflected on the candidate region with a lower likelihood and improves estimation accuracy more than the latter correction method, which is therefore preferable.

When there are a plurality of candidate regions of the second part, feature value correction section 140 corrects unique feature values of the candidate region of the part region or the second part for each pair of the part region and the second part candidate region.

Feature value correction section 140 may also perform the following process before correcting the aforementioned unique feature values. First, feature value correction section 140 calculates similarity between the unique feature value of the part region and the unique feature value of the second part candidate region calculated in feature value calculation section 130. Next, feature value correction section 140 determines whether or not there is any second part candidate region that can be estimated as the forearm paired with the part region based on the calculated similarity. If this determination result shows that there is no second part candidate region that can be estimated as the forearm paired with the part region, feature value correction section 140 corrects the aforementioned unique feature value.

Determining section 150 determines whether or not the part region and the second part candidate region are a pair of forearms based on the similarity (e.g., cosine similarity) between the unique feature value corrected in feature value correction section 140 and the unique feature value of the other candidate region. The postures of the forearms are estimated based on this determination.

Posture estimation apparatus 100 has, for example, a central processing unit (CPU), a storage medium such as a read-only memory (ROM) having a control program stored therein, and a working memory such as a random access memory (RAM). In this case, functions of the above-described sections are realized by the CPU executing the control program.

Posture estimation apparatus 100 provided with such a configuration provides the following effects.

When estimating postures of an indefinite number of people, it is difficult to grasp in advance clothes or color of the skin of each individual, and it is therefore a general practice to estimate a part using common feature values (e.g., edge, silhouette, contour or the like). In such part estimation, if there is no other part around a certain part, only edge information of the part is extracted, and it is therefore relatively easy to estimate that part. However, when estimating a part, there may be other parts around a certain part. That is, for example, when trunk 411 exists behind left forearm 423, not only edge information of left forearm 423 but also that of trunk 411 is acquired together, and it is therefore difficult to estimate left forearm 423. Moreover, a certain part may be hidden behind the other part. That is, for example, when part of left forearm 423 is hidden behind trunk 411, there is only a small area of an image in which left forearm 423 is visible and it is difficult to estimate left forearm 423 from an image feature value indicating the feature of the shape of the forearm alone.

On the other hand, people often typically wear symmetric clothes and paired parts often have the same color or texture on an image. For example, in the case of a person, since the right thigh and the left thigh wear single trousers, these parts can be estimated to have the same length and the same color, and the right arm and the left arm also often wear clothes in the same pattern and with the same sleeve length.

Thus, posture estimation apparatus 100 first extracts a plurality of candidate regions from an image using common feature values and divides the candidate regions into candidate regions of a part region and a second part. Next, posture estimation apparatus 100 calculates unique feature values for the part region and the second part candidate region respectively. Next, posture estimation apparatus 100 corrects the unique feature value of at least one of the part region and the second part candidate region based on the length, width, and angle of the other candidate region. Next, posture estimation apparatus 100 determines whether or not the part region and the second part candidate region are paired parts based on the similarity between the corrected unique feature value and the unique feature value of the other candidate region. Even when a candidate region of the other part (e.g., trunk 411) exists around the second part candidate region, this operation allows posture estimation apparatus 100 to narrow down candidate regions of the second part. Thus, even when it is difficult to estimate a posture of the one forearm or when at least one of the color and texture of the part is unknown beforehand, posture estimation apparatus 100 can estimate a posture of an articulated object including paired parts with high accuracy.

Figure 4:
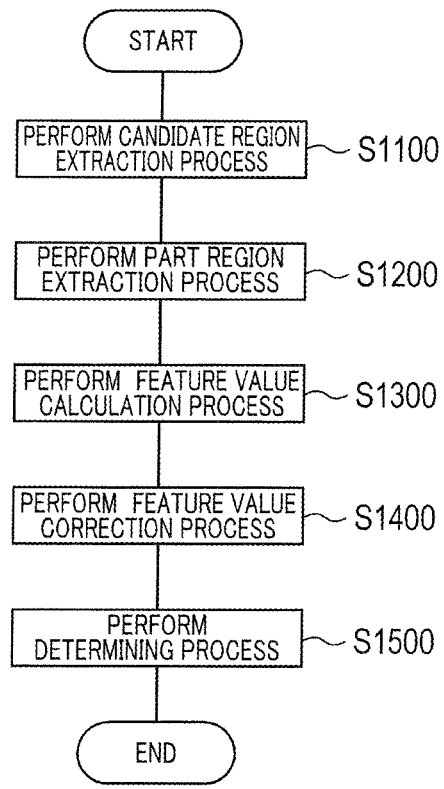
FIG. 4 is a flowchart illustrating an exemplary operation of the posture estimation apparatus according to Embodiment 2 of the present invention.

Next, operation of posture estimation apparatus 100 will be described. FIG. 4 is a flowchart illustrating an exemplary operation of the posture estimation apparatus.

First, in step S1100, candidate region extraction section 110 performs candidate region extraction process. The candidate region extraction process is a process of extracting a plurality of candidate regions of the forearms which are the subjects of estimation part.

Figure 5:
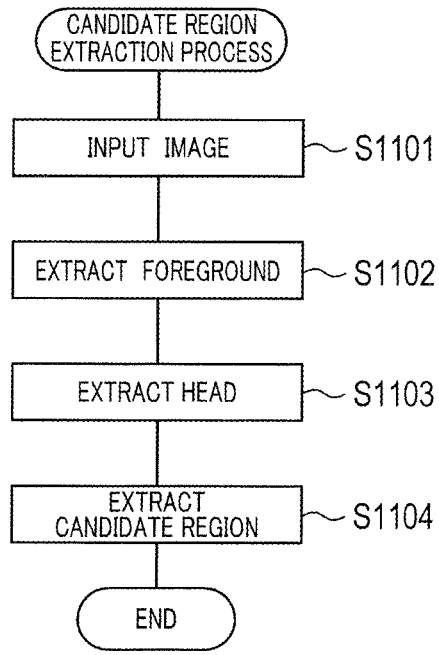
FIG. 5 is a flowchart illustrating an exemplary operation of candidate region extraction process in Embodiment 2 of the present invention.

Here, details of the candidate region extraction process in step S1100 will be described. FIG. 5 is a flowchart illustrating an exemplary operation of the candidate region extraction process.

First, in "image input" in step S1101, candidate region extraction section 110 receives an image from camera 320. This image is an image obtained by capturing a part or a whole of person 340.

Next, in "foreground extraction" in step S1102, candidate region extraction section 110 extracts a foreground part from the inputted image. More specifically, candidate region extraction section 110 generates a background difference image and extracts the foreground as a region estimated to be person 340 (hereinafter, referred to as a "person's candidate region"). A background difference image is an image indicating the difference between a background image captured without person 340 and an input image.

In the background difference image, for example, pixels having different pixel values between the inputted image and the background image are expressed in white and pixels having the same pixel value between the inputted image and the background image are expressed in black. That is, in the background difference image, a region where person 340 exists is expressed by a white region and a region where person 340 does not exist is expressed by a black region.

Next, in "head extraction" in step S1103, candidate region extraction section 110 extracts a region estimated to be head 418 (hereinafter, referred to as "head candidate region") and calculates a reference point of person 340. In the present embodiment, the reference point is assumed to be a connection point between head 418 and trunk 411, but the reference point is not limited to this.

Candidate region extraction section 110 extracts the white region as a candidate region of the person and extracts the upper region as a candidate region of the head. The upper region is predefined as a region including, for example, a portion of a predetermined ratio (e.g., 30%) of the candidate region (white region) of the person from a top end downward.

Candidate region extraction section 110 then extracts the head region from the extracted candidate region of the head using a Hough transform or the like. The Hough transform is a publicly known technique and can determine five parameters representing the center (X coordinate, Y coordinate), major axis, minor axis and inclination of an ellipse from edge information. Of points of intersection between the major axis of the ellipse and the ellipse, candidate region extraction section 110 calculates the lower point of intersection as a reference point which is a connection point between head 418 and trunk 411.

Next, in "candidate region extraction" in step S1104, a candidate region of the forearm is extracted. Here, two examples will be described where a candidate region of the forearm is extracted.

A first example will be described first. The first example is performed in the same way as in extraction of a candidate region of the head.

Candidate region extraction section 110 extracts the white region as a candidate region of the person, and extracts a region located at a predetermined distance from the reference point as a forearm possible location region. Here, the predetermined distance is predefined as a predetermined magnification (e.g., 7.5 times the minor axis) of the scale of the head region through learning in advance based on restriction information of person 340.

Candidate region extraction section 110 then extracts candidate regions of the forearm from the extracted forearm possible location region using a Hough transform or the like. The Hough transform is a publicly known technique and can determine five parameters representing the center (X coordinate, Y coordinate), major axis, minor axis and inclination of an ellipse from edge information. Candidate region extraction section 110 extracts those ellipses obtained in this way whose lengths of the major axis and the minor axis satisfy a predetermined condition as candidate regions of the forearm. Here, the predetermined condition is predefined as a range of a predetermined ratio (e.g., the major axis is smaller than 1.2 times the length of the major axis of the head region, the minor axis is smaller than 1.2 times the length of the minor axis of the head region) of the scale of the head region through learning in advance.

By this means, the candidate region of the forearm extracted by candidate region extraction section 110 is defined by the center (X coordinate, Y coordinate), major axis, minor axis and inclination of an ellipse respectively and outputted.

Next, a second example will be described. In the second example, a candidate region of the forearm is extracted from an edge pair likelihood map generated based on a forearm possible location region.

The edge pair likelihood map is a map assuming an edge pair likelihood calculated based on an edge pair parallel to a predetermined gradient direction located in the vicinity of each pixel as the value of each pixel. Since the width of parallel lines is determined based on restriction information of the thickness of the forearm in the present embodiment, the edge pair likelihood for each pixel indicates a likelihood that a pixel located in the vicinity of the pixel will be an edge of the forearm.

Figure 6:
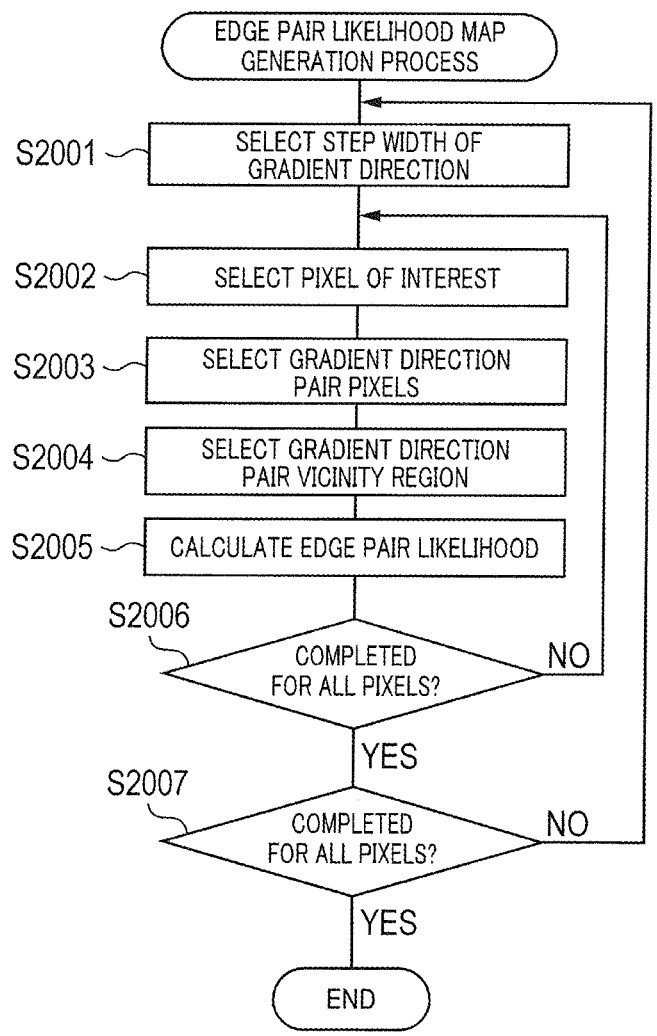
FIG. 6 is a flowchart illustrating an exemplary operation of edge pair likelihood map generation process in Embodiment 2 of the present invention.
Figure 7:
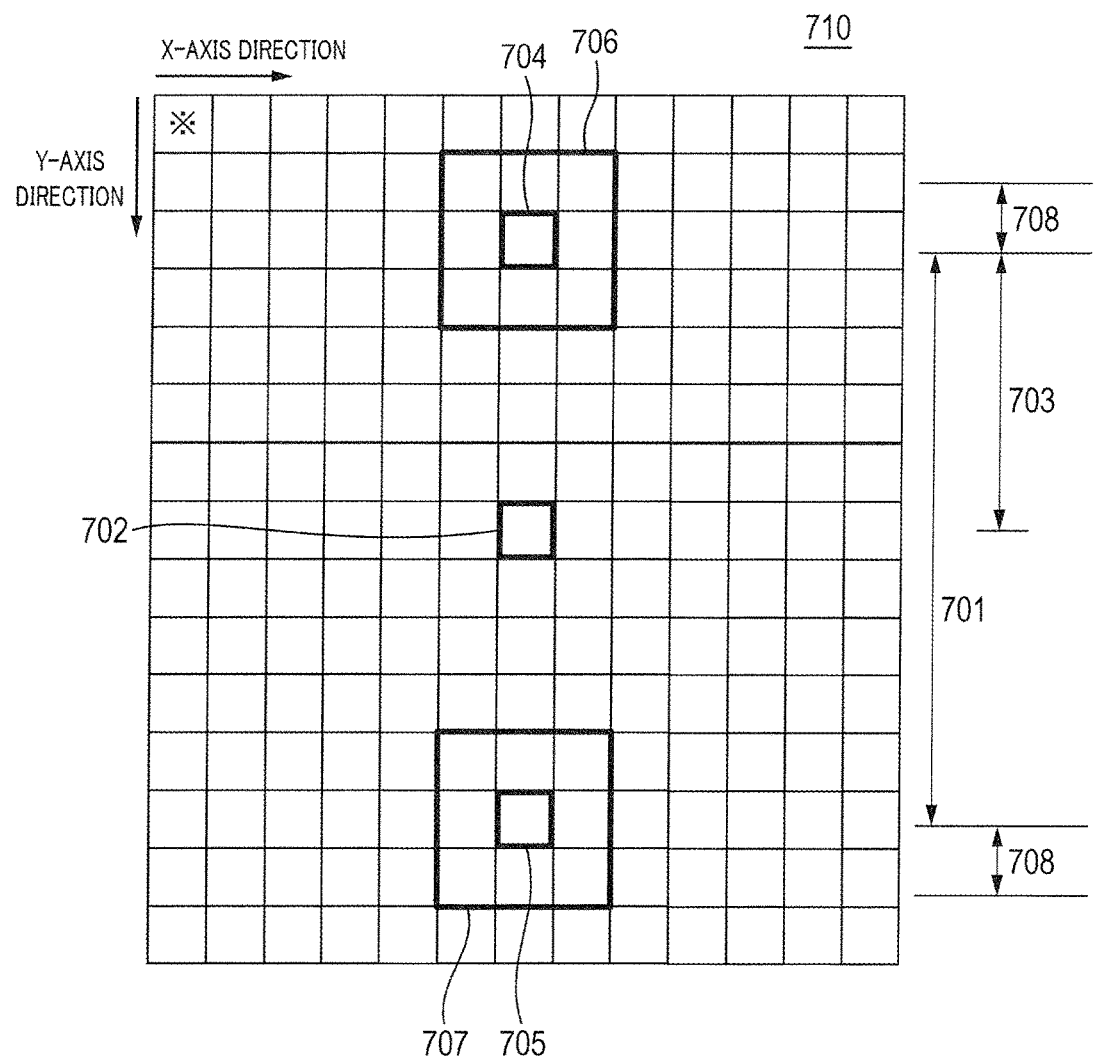
FIG. 7 is a diagram for describing the edge pair likelihood map generation process in Embodiment 2 of the present invention.

FIG. 6 is a flowchart illustrating exemplary operation of the edge pair likelihood map generation process. FIG. 7 is a diagram for describing process for generating an edge pair likelihood map whose gradient direction is a horizontal direction. An example of generating the edge pair likelihood map in the horizontal direction will be described here assuming that the horizontal direction is 0 degree.

In step S2001, candidate region extraction section 110 selects a step size of the edge pair likelihood map to be generated in the gradient direction. It is assumed here that the step size is set at 30 degrees in advance as an example. When the gradient direction is divided by 30 degrees, six edge pair likelihood maps of 0 degree, 30 degrees, 60 degrees, 90 degrees, 120 degrees and 150 degrees are generated. Therefore, in this case, candidate region extraction section 110 repeats the process from step S2002 to S2006 six times.

In step S2002, candidate region extraction section 110 selects a pixel of interest from the forearm possible location region. For example, in FIG. 7, candidate region extraction section 110 selects all pixels of the candidate regions of the second part of the arm as pixels of interest by repeating the following process. The process referred to here is a process to increment an X coordinate by one in an X-axis direction from the pixel in the top left corner (pixel shown by ·X·), and after moving to an end in the X-axis direction, return the X coordinate to an initial position (position of the pixel on the X coordinate shown by ·X·), increment a Y coordinate by one in a Y coordinate direction and increment the X coordinate by one in the X-axis direction. However, the method of selecting a pixel of interest is not limited to this. In FIG. 7, a case will be described as an example where pixel of interest 702 is selected from forearm possible location region 710.

In step S2003, candidate region extraction section 110 selects gradient direction pair pixels. In FIG. 7, pixels 704 and 705 are selected as the gradient direction pair pixels.

As described above, a case where the edge pair likelihood map in the horizontal direction is generated is described here as an example. Therefore, candidate region extraction section 110 selects two pixels 704 and 705 which satisfy two conditions as the gradient direction pair pixels. The two conditions are that pixels are located on a straight line which passes through pixel of interest 702 and which is perpendicular to the horizontal straight line, and that a distance from pixel of interest 702 is equal to length 703 which is half of thickness 701 of the target part. That is, when the edge pair likelihood map with angle θ is generated, candidate region extraction section 110 selects pixels, a distance between which becomes length 703 which is half of thickness 701 of the target part on a straight line which passes through the pixel of interest and which is perpendicular (θ+90 degrees) to angle θ as two gradient direction pair pixels. It should be noted that thickness 701 of the target part is predefined as a predetermined ratio of the scale of the head region (e.g., 1.2 times the length of the minor axis of the head region) through learning in advance.

In step S2004, candidate region extraction section 110 selects pixel groups located within a preset distance from the respective gradient direction pair pixels as gradient direction pair vicinity regions. In FIG. 7, the pixel groups located within a distance of vicinity length 708 from gradient direction pair pixels 704 and 705 are respectively selected as gradient direction pair vicinity regions 706 and 707. Vicinity length 708 is a predefined value which represents a length of the appearance error of the part. For example, vicinity length 708 is predefined as a predetermined ratio (e.g., 20% of the length of the minor axis of the head region) of the scale of the head region.

In step S2005, candidate region extraction section 110 calculates an edge pair likelihood of pixel of interest 702. Specifically, candidate region extraction section 110 calculates a product of a sum of luminance of the pixels within gradient direction pair vicinity region 706 and a sum of luminance of the pixels within gradient direction pair vicinity region 707 as the edge pair likelihood.

It should be noted that candidate region extraction section 110 may calculate a product of the number of pixels having luminance Y of a predetermined value or higher within gradient direction pair vicinity region 706 and the number of pixels having luminance Y of the predetermined value or higher within gradient direction pair vicinity region 707 as the edge pair likelihood. Accordingly, candidate region extraction section 110 can normalize the edge pair likelihood with the sizes of gradient direction pair vicinity regions 706 and 707.

In step S2006, candidate region extraction section 110 determines whether or not calculation of the edge pair likelihood has been completed for all the pixels of the forearm possible location region. If candidate region extraction section 110 determines that calculation for all the pixels has been finished (S2006: Yes), it is determined that generation of the edge pair likelihood map having the step size selected in step S2001 has been finished, and the flow proceeds to step S2007. Meanwhile, if candidate region extraction section 110 determines that calculation for all the pixels has not been finished (S2006: No), it is determined that generation of the edge pair likelihood map having the step size selected in step S2001 has not been finished, and the flow proceeds to step S2002.

In step S2007, candidate region extraction section 110 determines whether or not calculation of the edge pair likelihood has been finished for all the gradient directions. If candidate region extraction section 110 determines that calculation for all the gradient directions has been finished (S2006: Yes), it is determined that generation of the edge pair likelihood map in all the gradient directions determined in advance has been finished, and a series of processes is terminated. Meanwhile, if candidate region extraction section 110 determines that calculation has not been finished for all the gradient directions (S2006: No), it is determined that generation of the edge pair likelihood map in all the gradient directions determined in advance has not been finished. Therefore, the flow proceeds to step S2001 so that candidate region extraction section 110 may generate an edge pair likelihood map in a gradient direction which has not been generated.

Candidate region extraction section 110 extracts pixels where the likelihood of the edge pair likelihood map generated in this way is a predetermined threshold or higher as a forearm possible location region calculated from the edge pair likelihood map. Here, the predetermined threshold is predefined as a ratio (e.g., 10%) with respect to a maximum edge pair likelihood in the edge pair likelihood map.

Candidate region extraction section 110 extracts candidate regions of the forearm using a Hough transform from the forearm possible location region calculated from the edge pair likelihood map in much the same way as when candidate regions of the forearm are extracted from the forearm possible location region.

Thus, in the present embodiment, it is possible to more accurately extract candidate regions of the forearm which are target parts by narrowing down the forearm possible location region using restriction information of the forearm which is a target part.

A specific example of the candidate region extraction process in step S1100 has been described above.

Next, in step S1200, part region extraction section 120 performs a part region extraction process. The part region extraction process extracts a region which is likely to be the forearm among a plurality of candidate regions extracted in candidate region extraction section 110 as a "part region" which is a candidate region of a first part.

Here, three examples where a part region of the forearm is extracted will be described.

A first example will be described first. In the first example, part region extraction section 120 extracts a part region using a maximum value from a reference point on the contour of person 340.

Figure 8A:
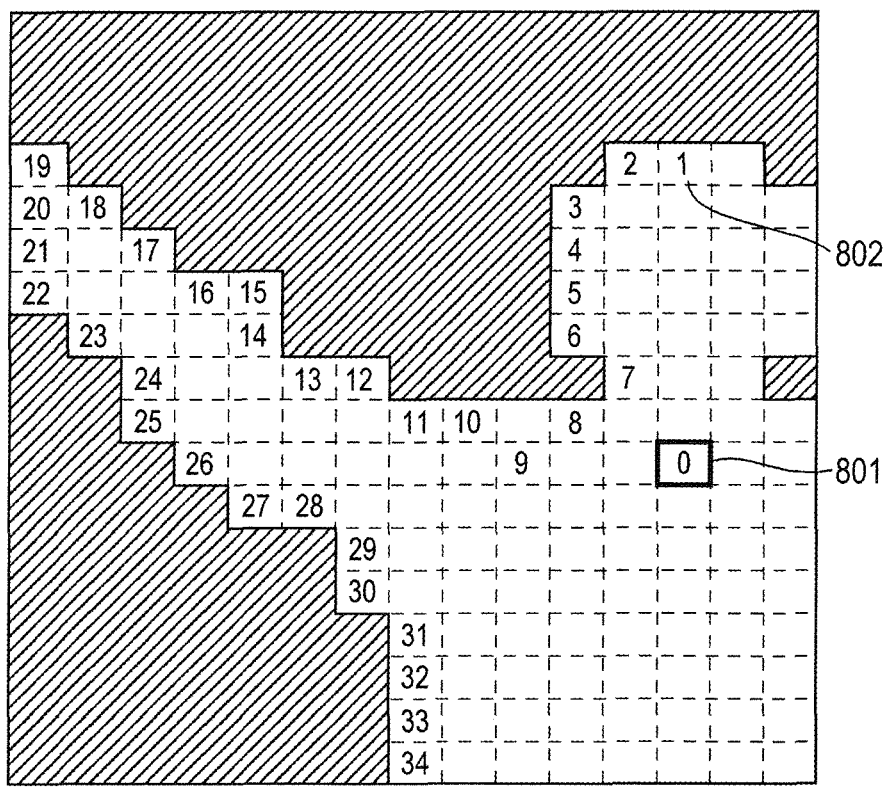
FIGS. 8A and 8B are diagrams provided for describing a maximum value in Embodiment 2 of the present invention.
Figure 8B:
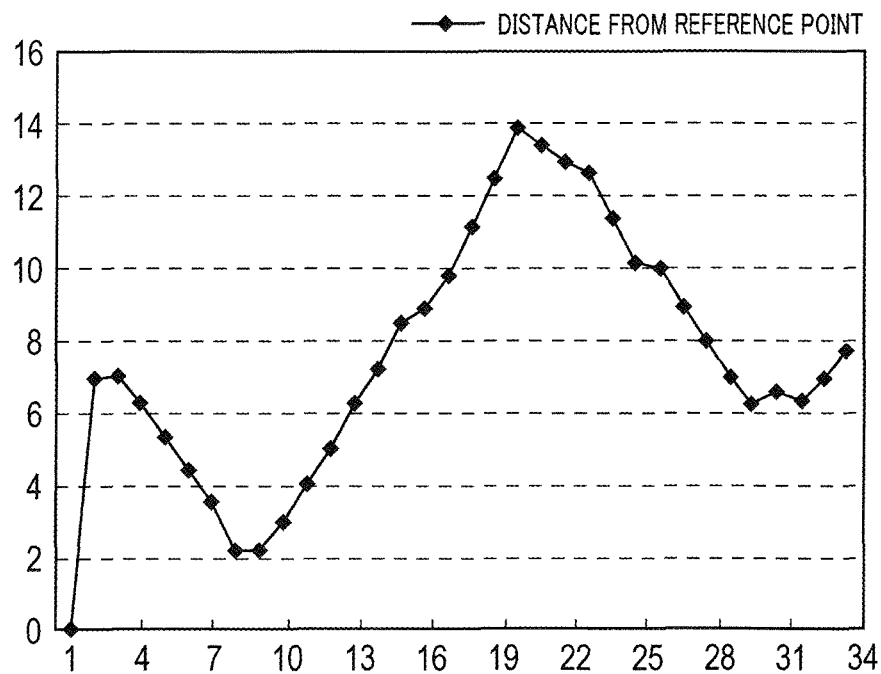

FIGS. 8A and 8B illustrate an example where a part region is extracted using a maximum value from a reference point on the contour.

FIG. 8A illustrates an example of part of a background difference image of person 340. In FIG. 8A, a white region shows pixels where an input image and a background image have different pixel values (region in which person 340 exists).

In FIG. 8A, reference numeral 801 illustrates a reference point of person 340.

Part region extraction section 120 selects pixel 802 on a boundary between the white region and the black region (hatching region) located just above the reference point and records pixel positions counterclockwise along the boundary. Numbers on pixels in FIG. 8A represent the order in which the pixels were recorded. Since pixel 802 is recorded first, it is numbered 1. It is assumed that recording is performed in order of, for example, upward left, left, downward left, lower, downward right pixels.

FIG. 8B is a graph illustrating the order in which pixels are recorded and distances between the pixels recorded in that order and the reference point. It is clear from this graph that pixel 20 in the recording order has a maximum value.

Part region extraction section 120 extracts one of the candidate regions extracted by candidate region extraction section 110, having the smallest distance from the maximum value as the part region. More specifically, of points of intersection between the major axis of the candidate region and the ellipse, part region extraction section 120 may designate a candidate region having a smaller distance between the point of intersection having a greater distance from the reference point and the maximum point as the part region or may also designate a candidate region having a smaller distance from the center of gravity of the second part candidate region and the reference point as the part region.

Thus, part region extraction section 120 can extract the candidate region which is least likely to contain information of the other part as the part region because the forearm is located apart from the other part (e.g., trunk).

Next, a second example will be described.

Part region extraction section 120 extracts the part region using the edge pair likelihood. More specifically, part region extraction section 120 calculates a sum of the edge pair likelihoods in each candidate region on the edge pair likelihood map and extracts a candidate region having the greatest sum as the part region.

Thus, part region extraction section 120 can extract a candidate region having most edge pair likelihoods of the target part and most likely to be the target part as the part region.

Next, a third example will be described.

Part region extraction section 120 combines the techniques in the first example and the second example to extract the part region. More specifically, of the points of intersection between the major axis of the second part candidate region and the ellipse, part region extraction section 120 extracts a candidate region having a smaller distance between the point of intersection having a greater distance from the reference point and the maximum point and having a greater sum of the edge pair likelihoods of the candidate region as the part region. More specifically, part region extraction section 120 may extract a candidate region having the highest value calculated using following equation 1 as the part region.

[1]
$$S_i = m \frac{\text{Max}[L]}{L_i} + n \frac{P_i}{\text{Max}[P]} \quad \text{(Equation 1)}$$

In equation 1, the respective values are as follows. Si is a score of the i-th candidate region. Max[L] is a maximum value of the distance between the candidate region and the reference point. Li is a maximum value of the distance between the i-th candidate region and the maximum point. Pi is a sum of edge pair likelihoods of the i-th candidate region. Max[P] is a maximum value of the sum of edge pair likelihoods of the candidate region. The terms "m" and "n" are predefined weight constants and are set so as to be n+m=1. The weight constants are set to the same ratio in an environment in which the distance between the candidate region and the reference point, and the edge pair likelihood are reliable to the same extent. On the other hand, in an environment in which the edge pair likelihood is more reliable than the distance between the candidate region and the reference point, the weight constant is set through advance learning such as making n greater than m.

By using two types of values, part region extraction section 120 can more accurately extract a candidate region that most satisfies both conditions of the distance from the reference point and edge pair likelihood of being the part, that is, a candidate region most likely to be the part to be estimated from among a plurality of candidate regions.

A specific example of the part region extraction process in step S1200 has been described above.

Next, in step S1300, feature value calculation section 130 calculates a unique feature value for each candidate region of the part region and the second part extracted in part region extraction section 120.

Here, two examples of the unique feature value will be described.

A first example is a histogram of luminance which is a publicly known technique of color information. More specifically, the luminance histogram which is an example of unique feature value expresses luminance values of pixels included in each second part candidate region as information of 256 bins having values of 0 to 255.

A second example is a histogram of edge pair likelihood of texture information. More specifically, the histogram of edge pair likelihood which is an example of unique feature value is information on the number of bins corresponding to the number of steps in the direction of parallel lines (e.g., 8 bins in the case of edge pair likelihood in 8 directions) obtained by normalizing values of edge pair likelihood included in each second part candidate region to values 0 to 1.

A specific example of the feature value calculation process in step S1300 has been described above.

Next, in S1400, feature value correction section 140 corrects a unique feature value of one of the part region and the second part candidate region calculated in feature value calculation section 130 based on at least one of the length, width, and angle of the other candidate region. For example, feature value correction section 140 corrects the unique feature value of the part region based on at least one of the length, width, and angle of the second part candidate region.

Note that the present embodiment will describe an example where the unique feature value of the part region out of the part region and the second part candidate region is recalculated, but the present invention is not limited to this. When there is a plurality of second part candidate regions, feature value correction section 140 corrects the aforementioned unique feature value for each pair of the part region and the second part candidate region.

Feature value correction section 140 performs a feature value correction process because feature value calculation section 130 may not be able to correctly acquire (calculate) unique feature values depending on the position or shape of the part region and the second part candidate region. Here, three examples where unique feature values cannot be correctly acquired will be described.

A first example will be described first. FIGS. 10A to 10D illustrate an example of posture of person 340 which is the subject of estimation.

Figure 10A:
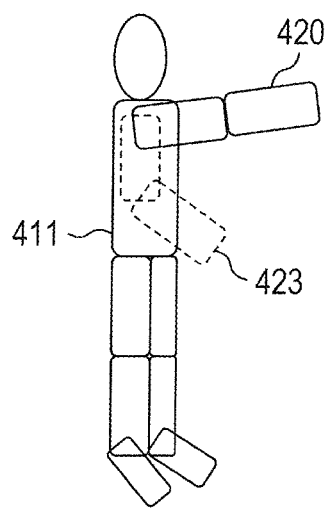
FIGS. 10A to 10D show an exemplary human posture in Embodiment 2 of the present invention.

FIG. 10A is an example in which a posture of a person who extends the right arm forward and slightly bends the left arm is shown using a body model viewed from the right side. The posture shown in FIG. 10A is seen when a person holds a basket or bag in the left hand and acquires articles using the right hand in purchasing action of acquiring articles from a store shelf. In FIG. 10A, whole right forearm 420 is visible. On the other hand, in FIG. 10A, about half of left forearm 423 is hidden behind trunk 411 which is another part, and only a tip thereof is visible.

Figure 10B:
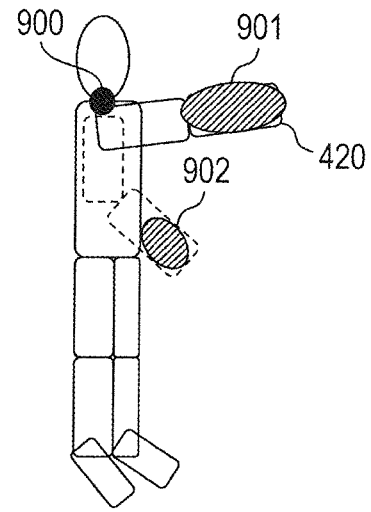

FIG. 10B is an example illustrating forearm part region 901 and second part candidate region 902 extracted from a captured image of person 340 in FIG. 10A. In FIG. 10B, right forearm 420 is located apart from the other part, extends in a direction perpendicular to the direction of camera 320 and has a long major axis. Thus, the candidate region extracted in right forearm 420 is extracted by part region extraction section 120 as part region 901.

FIGS. 13A to 13F illustrate an example of an image and a histogram thereof in the first example.

In the example in FIGS. 13A to 13F, since the forearm is not covered with clothes to the tip, feature values extracted from part region 901 of the forearm include features of the color or texture of the clothes and the skin of the arm. However, feature values extracted from second part candidate region 902 include only a feature value of the skin of the arm.

FIG. 13A illustrates an example of an image of the right arm shown in FIG. 10B and illustrates part region 901. FIG. 13B illustrates an example of an RGB histogram in FIG. 13A. FIG. 13C illustrates an example of a luminance histogram in FIG. 13A. FIG. 13D illustrates an example of an image of the left arm shown in FIG. 10B and illustrates second part candidate region 902. FIG. 13E illustrates an example of an RGB histogram in FIG. 13D. FIG. 13F illustrates an example of a luminance histogram in FIG. 13D. The histogram shows a distribution of value per pixel in a certain region. Though not shown in the example in FIG. 13, dark values of the image (darkest value is level 0) are displayed on the left side of the graph and bright values (brightest value is level 255) are displayed on the right side of the graph. The vertical axis of the graph shows the total number of pixels at each level.

The RGB histogram is obtained by outputting a histogram of each color channel of red, green and blue individually and then taking a sum for each level and displaying the sum. In the present embodiment, the RGB histogram is obtained by taking a sum for each level, but instead of superimposing one on another, it is also possible to arrange three sets of levels 0 to 255 (red, green and blue) to create a histogram of 768 levels.

The luminance histogram is obtained by converting pixel luminance values into a histogram.

In FIG. 13, part region 901 includes information on the clothes and skin, whereas second part candidate region 902 mainly includes information on no more than the skin, and so the RGB histogram and the luminance histogram are apparently different.

For this reason, the value of cosine similarity is not increased and second part candidate region 902 is not extracted as a paired part of part region 901. To make second part candidate region 902 a correctly extractable feature value, feature value correction section 140 needs to acquire feature values from part region 901 and half of second part candidate region 902 from the distal end.

Figure 10C:
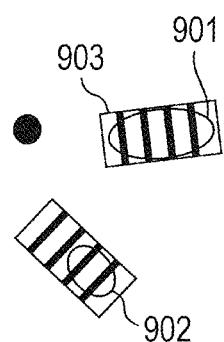

Next, a second example will be described. FIG. 10C illustrates examples of textures of part region 901 and second part candidate region 902. More specifically, it is assumed that person 340 wears striped shirts.

Figure 10D:
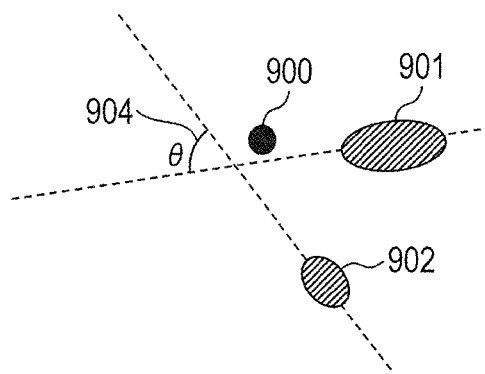

FIG. 10D illustrates reference point 900, part region 901 and second part candidate region 902 in FIG. 10B. In FIG. 10D, angle θ 904 is an angle showing a difference in inclination between part region 901 and second part candidate region 902.

Figure 14B:
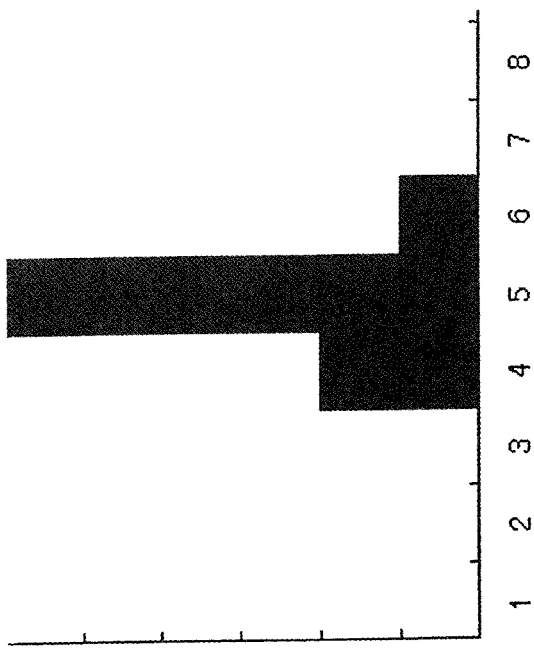
FIGS. 14A and 14B show an exemplary histogram when a unique feature value in Embodiment 2 of the present invention cannot be calculated correctly.
Figure 14A:
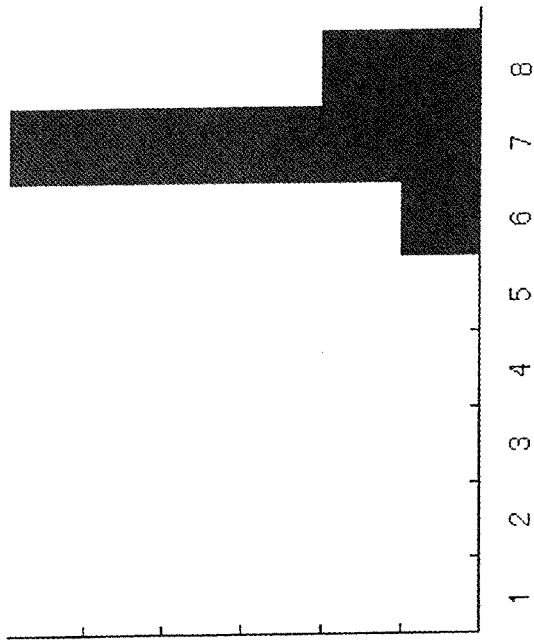

FIGS. 14A and 14B illustrate an exemplary histogram in the second example.

FIGS. 14A and 14B illustrate texture histograms when the person shown in FIG. 10B wears striped clothes shown in FIG. 10C. FIG. 14A illustrates a texture histogram of part region 901. FIG. 14B illustrates a texture histogram of candidate region 902.

The texture histograms in FIGS. 14A and 14B normalize a distribution of edge pair angles and illustrate the normalized distribution in 8 levels. An edge pair distribution in the horizontal direction (level 1) from the leftmost part of the graph is shown in order of steps of 22.5 degrees in the clockwise direction, showing an edge pair distribution in the direction of 157.5 degrees (level 8) on the right side of the graph. Since there are more edge pairs in the vertical direction as shown in FIG. 10C, the texture histogram of part region 901 in FIG. 14A has a higher value of level 4 that indicates the distribution of edge pairs in the vertical direction. The texture histogram in FIG. 14B has a highest value in a direction 135 degrees (level 7) clockwise from level 1 (horizontal direction).

For this reason, the cosine similarity value between feature values of part region 901 and second part candidate region is not high and second part candidate region 902 is not extracted as a paired part of part region 901. To make second part candidate region 902 a correctly extractable feature value, feature value correction section 140 needs to cause one of part region 901 and second part candidate region 902 to rotate by angle θ 904 and then acquire a feature value.

Next, a third example is illustrated. FIGS. 12A to 12F illustrate an exemplary posture of person 340.

FIG. 12A shows a body model of a posture viewed from the front in which right upper arm 419 is lowered and the elbow is folded so that the distal end of right forearm 420 is placed at the level of the shoulder. FIG. 12B shows the body model of the posture shown in FIG. 12A viewed from the right side. In this case, in the front view of the image, right upper arm 419 is invisible and only right forearm 420 is visible.

Figure 15C:
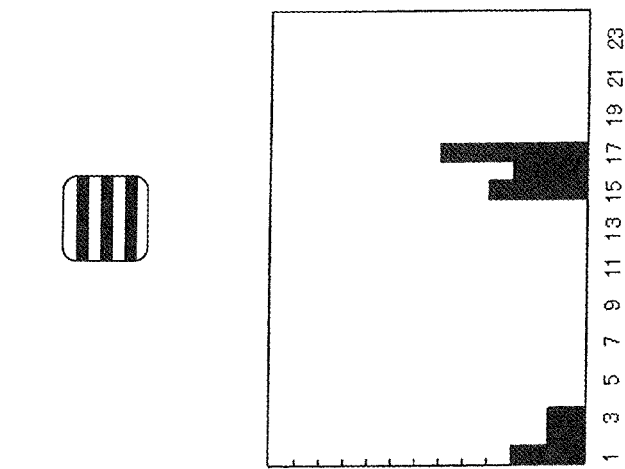
FIGS. 15A to 15C show an exemplary histogram when a unique feature value in Embodiment 2 of the present invention cannot be calculated correctly.
Figure 15B:
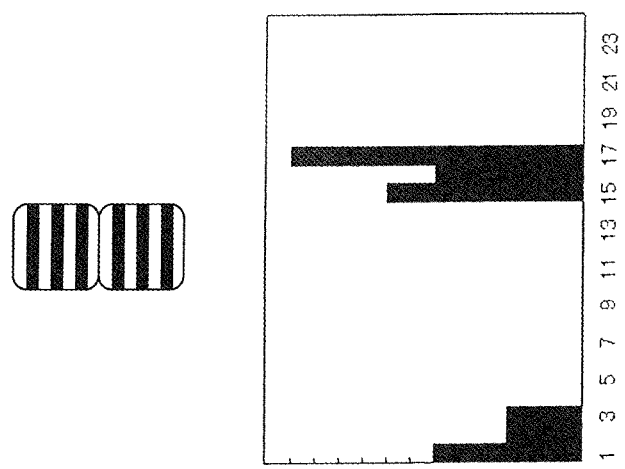
Figure 15A:
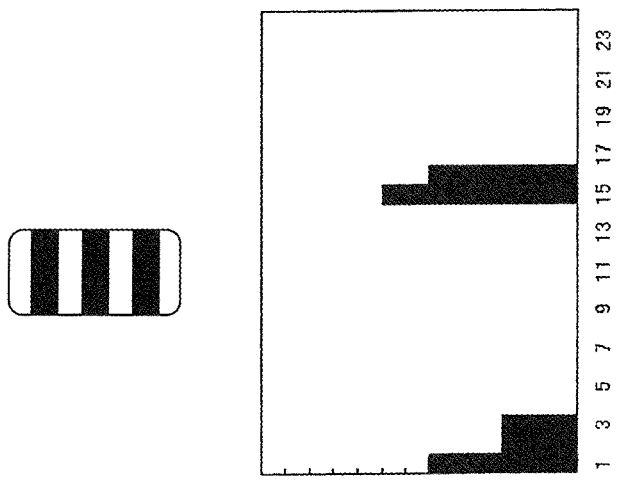

FIGS. 15A to 15C illustrate an exemplary histogram of the third example.

Texture histograms in FIGS. 15A to 15C show a distribution of edge pair angles and intervals in 24 levels without normalizing the distribution. The respective histograms in FIGS. 15A to 15C show a distribution of edge pairs in the horizontal direction from the leftmost part of the graph in steps of 22.5 degrees in a clockwise direction, showing a distribution of edge pairs in a direction of 157.5 degrees on the right side of the graph. This is similar to the histograms in FIGS. 14A and 14B. In addition, the respective histograms in FIGS. 15A to 15C show edge pair intervals in three-stage distributions (length indicating the thickness of the arm, ½ of the length indicating the thickness of the arm, and ¼ of the length indicating the thickness of the arm) for each direction. As a result, the histogram includes a total of 8 (directions)×3 (thickness) levels. For example, in the respective histograms in FIGS. 15A to 15C, the leftmost level in the graph shows a distribution of edge pairs when the edge pair direction is horizontal and the interval shows a distribution of edge pairs having a thickness of the arm. The second level shows a distribution of edge pairs when the edge pair direction is horizontal and the interval shows a ½ thickness of the arm. The third level shows a distribution of edge pairs when the edge pair direction is horizontal and the interval has a ¼ thickness of the arm.

FIG. 12C illustrates a schematic view when person 340 shown in FIG. 12A wears shirts including a striped pattern in the forearms.

In this case, part region extraction section 120 extracts left forearm 423 as a part region and extracts right forearm 420 as a second part candidate region.

Both unique feature values of the part region (left forearm 423 shown in FIG. 12C) and the second part candidate region (right forearm 420 shown in FIG. 12C) calculated in feature value calculation section 130 are expressed by the histogram shown in FIG. 15A, and show high similarity.

FIG. 12D illustrates a body model viewed from the front of a posture in which the person extends the right arm straightly forward and downward, and lowers the left arm. FIG. 12E illustrates the body model showing the posture shown in FIG. 12D viewed from the right side. In this case, as with FIG. 12A, left forearm 423 is extracted as the part region, and additionally, two candidate regions of the second part are extracted. More specifically, candidate region extraction section 110 is predicted to extract two regions: a part combining right upper arm 419 and right forearm 420 (hereinafter, referred to as a "combined region") and right forearm 420 as the candidate regions of the second part. Here, the extracted combined region is called "candidate region of second part A" and extracted right forearm 420 is called "candidate region of second part B."

FIG. 12F illustrates a schematic view when person 340 shown in FIG. 12D wears the same striped shirts as that shown in FIG. 12C.

In this case, the unique feature value of the part region (left forearm 423 shown in FIG. 12F) calculated in feature value calculation section 130 is expressed by a histogram shown in FIG. 15A which has a distribution of more thick-striped edge pairs. As the unique feature values of the candidate region of second part A (right upper arm 419 and right forearm 420 shown in FIG. 12F) and second part candidate region B (right forearm 420 shown in FIG. 12F), the thin-striped edge pair is also extracted. For this reason, the unique feature value of second part candidate region A is expressed by a histogram shown in FIG. 15B and the unique feature value of second part candidate region B is expressed by a histogram shown in FIG. 15C. Thus, the feature value of the texture of the part region and the feature value of the texture of second part candidate region A calculated in feature value calculation section 130 are different. Moreover, the feature value of the texture of the part region and the feature value of the texture of the candidate region of second part B calculated in feature value calculation section 130 are different.

However, similarity of feature values may increase and the second part candidate region can be estimated correctly by deforming the region in accordance with the ratio in major axes between the part region and the second part candidate region and extracting a recalculation region.

For example, the following situation is observed when the part region is left forearm 423 shown in FIG. 12F and the second part candidate region is right forearm 420 (the candidate region of second part B) shown in FIG. 12F. That is, when the part region is reduced in accordance with the length of the major axis of the candidate region of second part B, the feature value of the thin stripe shown in FIG. 15C is extracted in the same way as second part candidate region B. On the other hand, the following situation is observed when the part region is left forearm 423 shown in FIG. 12F and the second part candidate region is right upper arm 419 and right forearm 420 (second part candidate region A) shown in FIG. 12F. That is, since the part region and the candidate region of second part A have the same length of the major axis, the recalculation region does not change and the feature values are also different. Thus, it is possible to correctly estimate that the second part candidate region which is paired with the part region is not the candidate region of second part A but the candidate region of second part B.

For the reasons in the above three examples, feature value correction section 140 performs the feature value correction process in step S1400.

Figure 9:
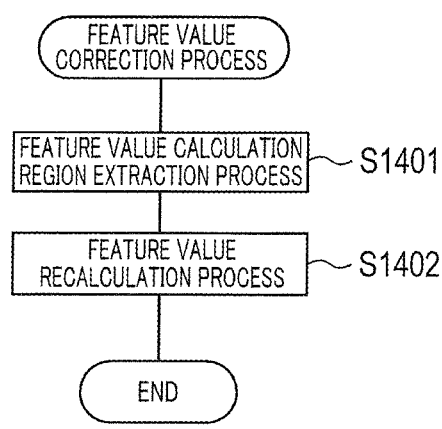
FIG. 9 is a flowchart illustrating an exemplary operation of feature value correction process in Embodiment 2 of the present invention.

FIG. 9 illustrates an exemplary flow of the feature value correction process in step S1400.

In step S1401, feature value correction section 140 performs a feature value calculation region extraction process on a pair of a part region and a candidate region of a second part whose cosine similarity does not satisfy a predetermined condition. Here, the predetermined condition may be set with a plurality of relative values of calculated cosine similarities (e.g., highest cosine similarity). Alternatively, the predetermined condition may be set with an absolute value of a cosine similarity threshold (e.g., cosine similarity is greater than 0.8). Alternatively, the predetermined condition may be set with both the above-described relative value and absolute value. As a result of the feature value calculation region extraction process in step S1401, a recalculation region which will be described later is extracted. Details of this step S1401 will be described later.

In step S1402, feature value correction section 140 performs a process of recalculating (correcting) a unique feature value from the recalculation region. Recalculation of the unique feature value here is performed in much the same way as the calculation of the unique feature value by feature value calculation section 130.

Note that feature value correction section 140 may use the same unique feature value used to calculate the unique feature value in feature value calculation section 130 or may calculate both unique feature values of color and texture. More robust determinations can be made by calculating a plurality of unique feature values.

Figure 11:
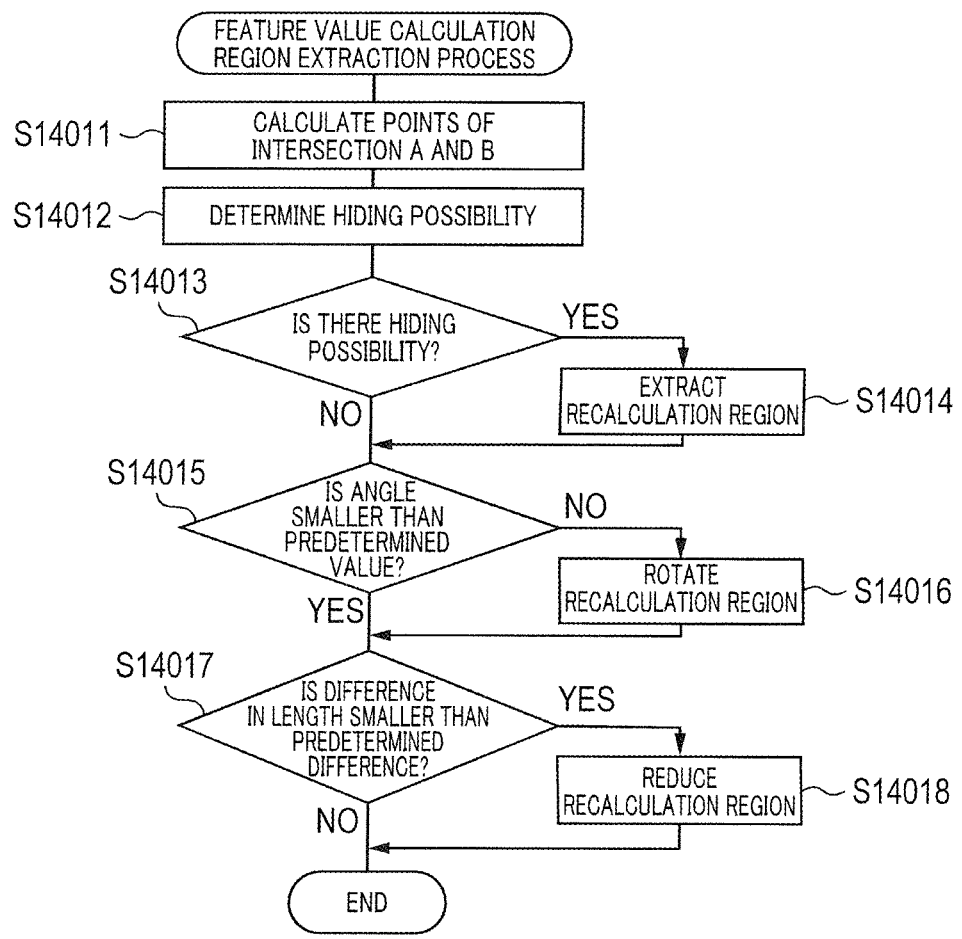
FIG. 11 is a flowchart illustrating an exemplary operation of feature value calculation region extraction process in Embodiment 2 of the present invention.

Next, details of the feature value calculation region extraction process will be described. FIG. 11 illustrates an exemplary flow of the feature value calculation region extraction process in step S1401.

In step S14011, feature value correction section 140 extracts point of intersection A (an example of the first point of intersection) having a smaller distance from reference point 900 and point of intersection B (an example of the second point of intersection) having a greater distance from reference point 900 as points of intersection between the major axis and ellipse of second part candidate region 902.

In step S14012, feature value correction section 140 determines where or not there is any possibility that second part candidate region 902 may be hidden behind another part (e.g., trunk 411) (hereinafter, referred to as "hiding possibility"). This determination is made based on the distance and angle from reference point 900 to point of intersection A and the distance and angle from reference point 900 to point of intersection B. More specifically, feature value correction section 140 determines whether or not point of intersection A and point of intersection B are included in a region where another part is likely to exist (hereinafter, referred to as "other part region"). The other part region is a region calculated and set based on restriction information on reference point 900 and person 340. For example, the other part region can be a rectangular region having a width 4 times that of the minor axis of the head and a length 8 times the minor axis of the head relative to reference point 900.

When the determination result in step S14012 shows that point of intersection A is included but point of intersection B is not included in the other part region, feature value correction section 140 determines that there is a hiding possibility (S14013: YES) and proceeds to the process in step 14014.

On the other hand, the determination result in step S14012 shows that point of intersection A is not included or point of intersection B is included in the other part region, feature value correction section 140 determines that there is no hiding possibility (S14013: NO) and proceeds to the process in step S14015.

In step S14014, feature value correction section 140 extracts a region where a unique feature value is recalculated, that is, a recalculation region from part region 901. First, feature value correction section 140 calculates a ratio of not hidden area R (e.g., 20%) based on a ratio between the length of a target part (e.g., 4 times the minor axis of the head region) and the length of the major axis of second part candidate region 902, which is restriction information. Next, feature value correction section 140 extracts a region of part region 901 corresponding to the ratio of area R from the distal end thereof as a recalculation region.

Note that when only color information is used to recalculate the feature value, the process may be terminated in this step S14014.

Although an example where only the skin of the arm is included in second part candidate region 902 has been described in FIG. 10, clothes may also be included in second part candidate region 902. In this case, similarity cannot be accurately determined by the process in step S14014 alone. This is because the texture of the clothes becomes a feature value which varies depending on the angle of the arm.

Thus, in order to determine similarity accurately, feature value correction section 140 preferably performs the process from step S14015 and steps after S14015.

In step S14015, when calculating a feature value of texture, feature value correction section 140 determines whether or not the angle formed by part region 901 with respect to second part candidate region 902 is smaller than a predetermined value (whether or not angle θ 904 shown in FIG. 10D is an angle smaller than a predetermined value). Here, the predetermined value indicates an estimation error of the angle of the candidate region and is a value acquired through advance learning (e.g., 15 degrees).

When the determination result in step S14015 shows that the angle is smaller than a predetermined value (S14015: YES), feature value correction section 140 proceeds to the process in step S14017.

On the other hand, when the determination result in step S14015 shows that the angle is not smaller than a predetermined value (S14015: NO), feature value correction section 140 proceeds to the process in step S14016.

In step S14016, feature value correction section 140 causes the recalculation region extracted in step S14014 using θ 904 which is a difference in the angle between part region 901 and second part candidate region 902. In the case where step S14014 has not been performed (S14013: NO), feature value correction section 140 rotates part region 901 using θ 904.

In step S14017, feature value correction section 140 compares the length of the major axis of part region 901 with the length of the major axis of second part candidate region 902 and determines whether or not the difference in the length of the major axis is smaller than a predetermined value. Here, the predetermined value represents an estimation error of the major axis and is a value set with a ratio (10% of the head region) of the major axis of the head region.

When the determination result in step S14017 shows that the difference in the length of the major axis is smaller than a predetermined value (S14017: YES), feature value correction section 140 proceeds to the process in step S14018.

On the other hand, when the determination result in step S14017 shows that the difference in the length of the major axis is not smaller than the predetermined value (S14017: NO), feature value correction section 140 outputs the recalculation region extracted in step S14016 and finishes a series of processes. Note that when the difference in the length of the major axis is not smaller than the predetermined value, if the process in step S14016 has not been performed in advance, feature value correction section 140 outputs the recalculation region extracted in step S14014 and finishes a series of processes. Moreover, when the difference in the length of the major axis is not smaller than the predetermined value, if the process in step S14014 and the process in step S14016 have not been performed in advance, feature value correction section 140 outputs part region 901 as the recalculation region and finishes a series of processes.

In step S14018, feature value correction section 140 reduces the size of part region 901 and designates part region 901 as the recalculation region. More specifically, feature value correction section 140 reduces the size of part region 901 in accordance with the ratio of the length of the major axis of second part candidate region 902 with respect to the length of the major axis of part region 901, designates part region 901 as the recalculation region and finishes a series of processes. For example, when the length of the major axis of part region 901 is 6 pixels and the length of the major axis of second part candidate region 902 is 3 pixels, feature value correction section 140 sets the ratio to 50% or the like. Feature value correction section 140 then reduces the area of part region 901 to 50% in accordance with the ratio 50%. Feature value correction section 140 designates reduced part region 901 as the recalculation region.

According to the above-described flow in FIG. 11, even when the apparent lengths of part region 901 and second part candidate region 902 are different because those parts have different angles, it is possible to correctly estimate second part candidate region 902 paired with part region 901.

In the flow in FIG. 11, step S14017 may be performed first and followed by step S14015.

Although a case has been described as an example where in step S14018, feature value correction section 140 reduces the size of the recalculation region, feature value correction section 140 may expand the recalculation region.

A specific example of the feature value correction process in step S1400 has been described so far.

Next, in step S1500, determining section 150 determines whether or not part region 901 and second part candidate region 902 are paired parts. More specifically, determining section 150 makes a determination using similarity between the feature values calculated in feature value correction section 140 as in the case of the technique of feature value correction section 140.

When calculating a plurality of feature values, feature value correction section 140 may calculate similarity using following equation 2.

[2]

$$CS'_i = m\frac{C_i}{\text{Max}[C]} + n\frac{T_i}{\text{Max}[T]} \quad \text{(Equation 2)}$$

Respective values in equation 2 are as follows. CSi' represents a similarity score of i-th second part candidate region 902. Max[C] represents a maximum value of similarity in color feature values between part region 901 and second part candidate region 902. Ci represents similarity in color feature values between i-th second part candidate region 902 and part region 901. Ti represents similarity in texture feature values between i-th second part candidate region 902 and part region 901. Max[T] represents a maximum value of similarity in texture feature values between part region 901 and second part candidate region 902. The terms "m" and "n" represent predefined weight constants and are set so as to satisfy n+m=1. The weight constants are set to the same ratio in an environment in which the color feature value and the texture feature value are reliable to the same degree. On the other hand, the weight constants are set through advance learning so that m is set to be greater than n in an environment in which the color feature value is more reliable than the texture feature value Determining section 150 extracts second part candidate region 902 having the maximum value of CSi' as a part to be paired with part region 901. Furthermore, when the number of second part candidate regions 902 is one, determining section 150 extracts second part candidate region 902 as a part to be paired with the part region if CSi' is a predetermined value or higher. The predetermined value is predefined through learning.

Thus, determining section 150 uses two feature values weighted in accordance with an environment, and can thereby more accurately extract a part to be paired with a part region.

A specific example of the determining the process in step S1500 has been described so far.

(Variations of Embodiments 1 and 2)

Embodiments 1 and 2 have been described so far, but the descriptions above are only examples, and can be modified in various ways. Hereinafter, variations of Embodiments 1 and 2 will be described.

For example, the operation of posture estimation apparatus 100 described in Embodiments 1 and 2 may also be provided by software in cooperation with hardware.

The articulated object has been described as a person, for example, in Embodiment 2, but the present invention is not limited to a person.

For example, in Embodiment 2, feature value correction section 140 may perform the following feature value determining process before correcting unique feature values.

An overview of the feature value determining process is as follows. First, feature value correction section 140 calculates similarity between a unique feature value of the part region and a unique feature value of the second part candidate region calculated in feature value calculation section 130. Next, feature value correction section 140 determines whether or not there is a second part candidate region that can be estimated as a forearm paired with the part region based on the calculated similarity. When this determination result shows that there is no second part candidate region that can be estimated as a forearm paired with the part region, feature value correction section 140 corrects the aforementioned unique feature value.

Hereinafer, a specific example of the feature value determining process will be described.

Description will be given on the assumption that feature value correction section 140 uses, for example, cosine similarity which is a publicly known technique to calculate similarity, but the similarity calculation technique is not limited to cosine similarity. Cosine similarity assumes multidimensional variables as vectors, has a maximum value of 1 when directions of the vectors match, has 0 when directions of the vectors are orthogonal to each other, and has a minimum value of −1 when directions of the vectors are opposite. Equation 3 of cosine similarity used by feature value correction section 140 is shown below.

[3]

$$CS = \frac{\sum_{i=1}^{k} x_i y_i}{\sqrt{\sum_{i=1}^{k} x_i^2} \sqrt{\sum_{i=1}^{k} y_i^2}} \quad \text{(Equation 3)}$$

The values in equation 3 are as follows. The term "k" represents the number of bins of the feature value. The term "$x_i$" represents the value of the i-th bin of the feature value of the part region. The term "$y_i$" represents the value of the i-th bin of the feature value of the second part candidate region.

Feature value correction section 140 calculates cosine similarity for each pair of part region 901 and second part candidate region 902. Feature value correction section 140 then determines whether or not second part candidate region 902 has a feature value similar to that of part region 901 based on the calculated cosine similarity for each pair. Here, feature value correction section 140 may extract second part candidate region 902 having the largest cosine similarity value as a candidate region to be paired with part region 901.

Thus, posture estimation apparatus 100 identifies second part candidate region 902 which is likely to be a part among second part candidate regions 902 extracted based on information indicating a shape common to person 340. Posture estimation apparatus 100 then compares the similarity between part region 901 and identified second part candidate region 902, and the similarity between part region 901 and other second part candidate region 902 using a feature value indicating information specific to a part of an individual person. Even when there are a plurality of second part candidate regions 902, this allows posture estimation apparatus 100 to accurately estimate the paired part.

A posture estimation apparatus according to the present disclosure is a posture estimation apparatus that estimates a paired part based on an image including a whole or part of an articulated object having the paired part, the posture estimation apparatus including: a candidate region extraction section that extracts a plurality of candidate regions of the paired part from the image using a common feature value indicating features of a shape common to an indefinite number of articulated objects regarding the paired part; a part region extraction section that extracts a first candidate region having a maximum likelihood of being the paired part from the plurality of candidate regions and designates a region other than the first candidate region as a second candidate region; a feature value calculation section that calculates a unique feature value indicating a feature unique to the articulated object to be estimated about the paired part in each of the first candidate region and the second candidate region; a feature value correction section that corrects a unique feature value of one of the first candidate region and the second candidate region based on at least one of a length, width, and angle of the other candidate region; and a determining section that determines whether or not the first candidate region and the second candidate region are the paired parts based on similarity between the corrected unique feature value and a unique feature value of the other candidate region.

In the posture estimation apparatus of the present disclosure, the feature value correction section calculates similarity between the unique feature value of the first candidate region and the unique feature value of the second candidate region, determines whether or not there is any second candidate region that can be estimated to be paired with the first candidate region based on the calculated similarity, and corrects, when the determination result shows that there is no second candidate region that can be estimated to be paired with the first candidate region, the unique feature value of the one of the candidate regions.

In the posture estimation apparatus according to the present disclosure, the feature value correction section corrects the unique feature value of the first candidate region based on at least one of the length, width, and angle of the second candidate region.

In the posture estimation apparatus according to the present invention, the feature value correction section extracts, as points of intersection between a major axis and an ellipse of the second candidate region, a first point of intersection having a smaller distance from a reference point and a second point of intersection having a greater distance from the reference point, determines a likelihood that the second candidate region is hidden behind the other part based on whether or not the first point of intersection and the second point of intersection are included in a region in which another part is likely to exist, extracts part of the first candidate region when the first point of intersection and the second point of intersection are likely to be hidden, and calculates a unique feature value of the extracted part of the first candidate region.

In the posture estimation apparatus according to the present disclosure, the feature value correction section determines whether or not an angle formed by the first candidate region with respect to the second candidate region is 0 degrees, and causes, when the angle is not 0 degrees, a part or a whole of the first candidate region to rotate using the angle.

In the posture estimation apparatus according to the present disclosure, the feature value correction section compares the length of the major axis of the first candidate region with the length of the major axis of the second candidate region, reduces, when the difference in the length of the major axis is smaller than a predetermined value or when the lengths of the major axis are the same, the first candidate region in accordance with a ratio of the length of the major axis of the second candidate region to the length of the major axis of the first candidate region, and calculates a unique feature value for the reduced first candidate region.

In the posture estimation apparatus according to the present disclosure, the candidate region extraction section extracts the plurality of candidate regions based on predefined restriction information on characteristics of the paired part.

In the posture estimation apparatus according to the present disclosure, the common feature value is only an edge or an edge and silhouette.

In the posture estimation apparatus according to the present disclosure, the unique feature value is at least one of a color and a texture.

A posture estimation method according to the present disclosure is a method of estimating a paired part based on an image including a whole or part of an articulated object having the paired part, the method including: extracting a plurality of candidate regions of the paired part from the image using a common feature value indicating features of a shape common to an indefinite number of articulated objects regarding the paired part; extracting a first candidate region having a maximum likelihood of being the paired part from the plurality of candidate regions and designating a region other than the first candidate region as a second candidate region; calculating a unique feature value indicating a feature unique to the articulated object to be estimated about the paired part in each of the first candidate region and the second candidate region; correcting a unique feature value of one of the first candidate region and the second candidate region based on at least one of a length, width, and angle of the other candidate region; and determining whether or not the first candidate region and the second candidate region are the paired parts based on similarity between the corrected unique feature value and a unique feature value of the other candidate region.

A posture estimation program according to the present disclosure is a program that causes a computer of an apparatus that estimates a paired part based on an image including a whole or part of an articulated object having the paired part to execute processing, the program including the processing including: extracting a plurality of candidate regions of the paired part from the image using a common feature value indicating features of a shape common to an indefinite number of articulated objects regarding the paired part; extracting a first candidate region having a maximum likelihood of being the paired part from the plurality of candidate regions and designating a region other than the first candidate region as a second candidate region; calculating a unique feature value indicating a feature unique to the articulated object to be estimated about the paired part in each of the first candidate region and the second candidate region; correcting a unique feature value of one of the first candidate region and the second candidate region based on at least one of a length, width, and angle of the other candidate region; and determining whether or not the first candidate region and the second candidate region are the paired parts based on similarity between the corrected unique feature value and a unique feature value of the other candidate region.

The disclosure of the specification, drawings and abstract in Japanese Patent Application No. 2012-165671 filed on Jul. 26, 2012 is incorporated herein by reference in its entirety.

INDUSTRIAL APPLICABILITY

The posture estimation apparatus, posture estimation method, and posture estimation program according to the present invention are useful as an apparatus, method and program capable of estimating a posture of an articulated object having paired parts, with high accuracy.

REFERENCE SIGNS LIST

100 Posture estimation apparatus
110 Candidate region extraction section
120 Part region extraction section
130 Feature value calculation section
140 Feature value correction section
150 Determining section
200 Posture estimation system
310 Image capturing area
320 Camera
330 Floor surface
340 Person

The invention claimed is:

1. A posture estimation apparatus that estimates a paired part based on an image including a whole or part of an articulated object having the paired part, the posture estimation apparatus comprising a processor configured to:
   extract a plurality of candidate regions of the paired part from the image using a common feature value indicating features of a shape common to an indefinite number of articulated objects regarding the paired part;
   extract a first candidate region having a maximum likelihood of being the paired part from the plurality of candidate regions and designates a region other than the first candidate region as a second candidate region;
   calculate a unique feature value indicating a feature unique to the articulated object to be estimated about the paired part in each of the first candidate region and the second candidate region;
   correct a unique feature value of one of the first candidate region and the second candidate region based on at least one of a length, width, and angle of the other candidate region; and
   determine whether or not the first candidate region and the second candidate region are the paired parts based on similarity between the corrected unique feature value and a unique feature value of the other candidate region.

2. The posture estimation apparatus according to claim 1, wherein the processor is further configured to calculate a similarity between the unique feature value of the first candidate region and the unique feature value of the second candidate region, determine whether or not there is any second candidate region that can be estimated to be paired with the first candidate region based on the calculated similarity, and correct the unique feature value of the one of the candidate regions when the determination result shows that there is no second candidate region that can be estimated to be paired with the first candidate region.

3. The posture estimation apparatus according to claim 1, wherein the processor is further configured to correct the unique feature value of the first candidate region based on at least one of the length, width, and angle of the second candidate region.

4. The posture estimation apparatus according to claim 1, wherein the processor is further configured to extract, as points of intersection between a major axis and an ellipse of the second candidate region, a first point of intersection having a smaller distance from a reference point and a second point of intersection having a greater distance from the reference point, determines a likelihood that the second candidate region is hidden behind the other part based on whether or not the first point of intersection and the second point of intersection are included in a region in which another part is likely to exist, extracts part of the first candidate region when the first point of intersection and the second point of intersection are likely to be hidden, and calculates a unique feature value of the extracted part of the first candidate region.

5. The posture estimation apparatus according to claim 1, wherein the processor is further configured to determine whether or not an angle formed by the first candidate region with respect to the second candidate region is 0 degrees, and causes, when the angle is not 0 degrees, a part or a whole of the first candidate region to rotate using the angle.

6. The posture estimation apparatus according to claim 1, wherein the processor is further configured to compare the length of the major axis of the first candidate region with the length of the major axis of the second candidate region, reduces, when the difference in the length of the major axis is smaller than a predetermined value or when the lengths of the major axis are the same, the first candidate region in accordance with a ratio of the length of the major axis of the second candidate region to the length of the major axis of the first candidate region, and calculates a unique feature value for the reduced first candidate region.

7. The posture estimation apparatus according to claim 1, wherein the processor is further configured to extract the plurality of candidate regions based on predefined restriction information on characteristics of the paired part.

8. The posture estimation apparatus according to claim 1, wherein the common feature value is only an edge or an edge and silhouette.

9. The posture estimation apparatus according to claim 1, wherein the unique feature value is at least one of a color and a texture.

10. A posture estimation method of estimating a paired part based on an image including a whole or part of an articulated object having the paired part, the posture estimation method comprising:

extracting a plurality of candidate regions of the paired part from the image using a common feature value indicating features of a shape common to an indefinite number of articulated objects regarding the paired part;

extracting a first candidate region having a maximum likelihood of being the paired part from the plurality of candidate regions and designating a region other than the first candidate region as a second candidate region;

calculating a unique feature value indicating a feature unique to the articulated object to be estimated about the paired part in each of the first candidate region and the second candidate region;

correcting a unique feature value of one of the first candidate region and the second candidate region based on at least one of a length, width, and angle of the other candidate region; and determining whether or not the first candidate region and the second candidate region are the paired parts based on similarity between the corrected unique feature value and a unique feature value of the other candidate region.

11. A posture estimation program stored on a non-transitory computer readable medium that causes a computer of an apparatus that estimates a paired part based on an image including a whole or part of an articulated object having the paired part to execute processing, the posture estimation program including the processing comprising:

extracting a plurality of candidate regions of the paired part from the image using a common feature value indicating features of a shape common to an indefinite number of articulated objects regarding the paired part;

extracting a first candidate region having a maximum likelihood of being the paired part from the plurality of candidate regions and designating a region other than the first candidate region as a second candidate region;

calculating a unique feature value indicating a feature unique to the articulated object to be estimated about the paired part in each of the first candidate region and the second candidate region;

correcting a unique feature value of one of the first candidate region and the second candidate region based on at least one of a length, width, and angle of the other candidate region; and determining whether or not the first candidate region and the second candidate region are the paired parts based on similarity between the corrected unique feature value and a unique feature value of the other candidate region.

* * * * *